United States Patent
Noll et al.

(10) Patent No.: US 8,799,471 B2
(45) Date of Patent: Aug. 5, 2014

(54) METHOD AND SYSTEM FOR DELIVERING PERSONALIZED BROADBAND CONTENT

(75) Inventors: Roland Noll, Columbia, MD (US);
Khanh Mai, Alpharetta, GA (US); Tom Grimes, Ottawa (CA)

(73) Assignee: Andrews Kurth LLP, Houston, TX (US)

( * ) Notice: Subject to any disclaimer, the term of this patent is extended or adjusted under 35 U.S.C. 154(b) by 1147 days.

(21) Appl. No.: 11/039,849

(22) Filed: Jan. 24, 2005

(65) Prior Publication Data

US 2005/0132295 A1  Jun. 16, 2005

Related U.S. Application Data

(63) Continuation of application No. 09/835,529, filed on Apr. 17, 2001, now abandoned.

(60) Provisional application No. 60/197,682, filed on Apr. 17, 2000.

(51) Int. Cl.

| | | |
|---|---|---|
| *G06F 15/173* | (2006.01) | |
| *H04N 7/10* | (2006.01) | |
| *H04N 21/462* | (2011.01) | |
| *H04N 21/2668* | (2011.01) | |
| *H04N 7/173* | (2011.01) | |
| *H04N 21/433* | (2011.01) | |
| *H04N 21/81* | (2011.01) | |
| *G06Q 30/02* | (2012.01) | |
| *H04N 21/478* | (2011.01) | |
| *H04N 21/4782* | (2011.01) | |
| *H04N 21/258* | (2011.01) | |
| *H04N 21/482* | (2011.01) | |
| *H04N 21/254* | (2011.01) | |
| *H04N 21/2543* | (2011.01) | |
| *H04N 21/426* | (2011.01) | |
| *H04N 21/24* | (2011.01) | |
| *H04N 21/442* | (2011.01) | |
| *H04N 21/61* | (2011.01) | |

(52) U.S. Cl.
CPC ....... *H04N 21/2542* (2013.01); *H04N 21/4622* (2013.01); *H04N 21/2668* (2013.01); *H04N 7/17318* (2013.01); *H04N 21/4331* (2013.01); *H04N 21/8173* (2013.01); *G06Q 30/02* (2013.01); *H04N 21/47805* (2013.01); *H04N 21/4782* (2013.01); *H04N 21/25891* (2013.01); *H04N 21/482* (2013.01); *H04N 21/2543* (2013.01); *H04N 21/42684* (2013.01); *H04N 21/812* (2013.01); *H04N 21/2402* (2013.01); *H04N 21/44222* (2013.01); *H04N 21/6125* (2013.01); *H04N 21/2541* (2013.01)
USPC ................ 709/226; 725/32; 725/33; 725/34; 725/35; 725/36

(58) Field of Classification Search
CPC ..................................... H04N 21/458
USPC ......................... 709/226; 725/32–36, 86–104
See application file for complete search history.

(56) References Cited

U.S. PATENT DOCUMENTS

| 5,608,446 A | * | 3/1997 | Carr et al. ...................... 725/114 |
| 5,844,620 A | * | 12/1998 | Coleman et al. ................ 725/54 |

(Continued)

*Primary Examiner* — Shirley Zhang
(74) *Attorney, Agent, or Firm* — Andrews Kurth LLP; Aldo Noto; Sean Wooden

(57) ABSTRACT

A system and method (the "Channel Dancer") of delivering broadband content that has been personalized for a recipient user is disclosed. By excelling in the personalization of the user's view of broadband content on the Internet and otherwise, the system and method develop "stickiness" with the user that maximizes the benefits and effectiveness of advertising and related activities. The system preferably comprises a network operations center ("NOC") that receives and packages content, with promotional materials, on virtual channels, a transmission medium that transmits the virtual channels, a broadband ISP with a point-of-presence ("POP") server that receives the virtual channels and routs virtual channels to a user machine, based on requests received from client software (the "client") resident on the user machine and filtering performed by the client based on a personal profile of the user.

19 Claims, 29 Drawing Sheets

(56) References Cited

U.S. PATENT DOCUMENTS

| | | | |
|---|---|---|---|
| 6,018,768 A * | 1/2000 | Ullman et al. | 709/218 |
| 6,421,067 B1 * | 7/2002 | Kamen et al. | 715/719 |
| 6,502,242 B1 * | 12/2002 | Howe et al. | 725/109 |
| 6,637,029 B1 * | 10/2003 | Maissel et al. | 725/46 |
| 6,792,615 B1 * | 9/2004 | Rowe et al. | 725/37 |
| 6,850,252 B1 * | 2/2005 | Hoffberg | 715/716 |
| 7,032,236 B1 * | 4/2006 | Ozkan et al. | 725/39 |
| 7,106,338 B1 * | 9/2006 | Kamen et al. | 345/543 |
| 7,117,516 B2 * | 10/2006 | Khoo et al. | 725/46 |
| 7,328,450 B2 * | 2/2008 | Macrae et al. | 725/42 |
| 2001/0013123 A1 * | 8/2001 | Freeman et al. | 725/34 |
| 2002/0032907 A1 * | 3/2002 | Daniels | 725/51 |
| 2003/0020744 A1 * | 1/2003 | Ellis et al. | 345/723 |
| 2004/0078825 A1 * | 4/2004 | Murphy | 725/109 |
| 2005/0144641 A1 * | 6/2005 | Lewis | 725/60 |

\* cited by examiner

METHOD AND SYSTEM FOR DELIVERING PERSONALIZED BROADBAND CONTENT

CROSS REFERENCE TO RELATED APPLICATIONS

This is a Continuation application of Ser. No. 09/835,529, filed Apr. 17, 2001, which in turn claimed the benefit of priority of U.S. Provisional Patent Application Ser. No. 60/197,682, filed Apr. 17, 200, and which both applications are hereby incorporated by reference in their entirety. This application also hereby incorporates by reference U.S. patent application Ser. No. 09/878,232, filed Jun. 12, 2001.

TECHNICAL FIELD

The technical field is delivery of broadband content and personalized multimedia content delivery systems.

BACKGROUND

Over the past ten years, the bandwidth capacity available to consumers for receiving content from the Internet and other networks has increased ten-fold and more. The increased bandwidth capacity has enabled consumers to download larger and larger files and other content, including rich media and multimedia content such as video clips, songs and movies. This increased bandwidth capacity has increased Internet usage and the potential for enjoyable and productive usage.

Despite the increased bandwidth capacity, however, prior to the present invention, there were no consumer-based broadband services that automate the delivery of rich media and multimedia content directly to the consumer's personal computer (PC) or Internet access device. Prior to the present invention, there were no service providers optimizing the use of a broadband connection by distributing multiple channels of rich media content and providing a mechanism to automate the selective tuning to desired material. Prior to the present invention, there were no mechanisms available to support Internet protocol ("IP") recording and hence the time-shifted viewing of rich media material broadcast to the consumers PC or Internet access device.

Likewise, there has been an increase in the efforts of companies to gather information about consumers and to target consumers with advertising. Despite this effort, however, prior to the present invention there was no user interface that incorporates a profiling engine in offering personalized access to available material. Indeed, prior to the present invention, there was no personalized offering of rich media material to consumer PCs and Internet access devices. Further, companies gathering information about consumers seek to utilize that information remotely from the consumer PC or Internet access device, therefore raising privacy concerns. Moreover, prior to the present invention there were user interfaces are available that support downloading rich media content and provide utilities for the ongoing management of local disk resources that store or cache the rich media content.

For the broadcaster or source of content, advertising, and e-commerce opportunities to a consumer PC or Internet access device, prior to the present invention there was no way to combine multiple threads of targeted advertising with the delivery of broadband video, without the expensive pre-broadcast process of authoring of video content. Authoring of video content is a frame-by-frame, labor-intensive process of associating advertising into video content by inserting "triggers" in the video stream itself. Likewise, prior to the present invention, there was no way to support multiple concurrent channels of IP-based video within a system that allows individual clients to dynamically link to channels of a specific interest. Moreover, prior to the present invention, there was no easy, integrated way to implement pay-per-view ("PPV") and subscription in the distribution of broadcast video content. Further, the broadcaster, prior to the present invention, has no way to receive real-time statistics on system usage, including targeted advertising impressions and click-throughs.

SUMMARY

A system and method (the "Channel Dancer") of delivering broadband content that has been personalized for a recipient user is disclosed by this application. By excelling in the personalization of the user's view of broadband content on the Internet and otherwise, the system and method develop "stickiness" with the user that maximizes the benefits and effectiveness of advertising and related activities.

An embodiment of the system comprises a network operations center ("NOC") that collects, aggregates and classifies content, assigns appropriate targeted advertising and e-commerce material to the content, and schedules the content for transmission on "virtual channels", a transmission medium, such as a satellite, that transmits the virtual channels, an edge-of-net location, such as a broadband Internet Service Provider ("ISP"), that receives the virtual channels transmitted from the transmission medium, and a user machine (e.g., a personal computer ("PC")) on which resides client software (the "client"). The NOC also preferably generates and transmits to the client a control channel comprising content programming information and graphical user interface ("GUI") "skins" updates. The GUI skins are used to dynamically update GUIs through which the user views and selects content, and are used to deliver target advertising and e-commerce opportunities based, for example, on user feedback. The system preferably also comprises a point-of-presence ("POP") client server, referred to as the "Channel Dancer" server, which resides at the edge-of-net location, or another location, and that acts as a router, propagating requested or personalized virtual channels to the client. The NOC may also comprise one or more servers for carrying out the above tasks and for keeping track of user feedback received over the Internet or otherwise, handling pay-per-view transactions and managing client services, including billing.

These advantages are achieved by, for example, a method for customizing an interface to accommodate a user's availability of content. The method includes determining a link speed that a user machine can accommodate and using a control channel and the determined link speed, creating a display of content choices available to a user on the user machine.

These advantages are achieved by, for example, a method for gathering data about a subscriber over the Internet using incentives. The method includes offering an incentive in exchange for receiving data about a subscriber, receiving acceptance of the offer, and providing the offered incentive, wherein the incentive may be used to purchase content.

These advantages are achieved by, for example, a method for delivering personalized broadband content. The method includes receiving a request for a portion of multicast data in IP protocol, receiving multicast data in an IP protocol, locating the requested portion of multicast data, and sending the requested portion of multicast data to a user machine connected to an ISP.

These advantages are achieved by, for example, a method for advertising with rich media type content. The method includes sending an advertisement linked to rich media content to a user machine, displaying the advertisement with the rich media content at the user machine, storing the advertisement in a memory device, and recalling the advertisement for display with other rich media content.

These advantages are achieved by, for example, a method of delivering personalized broadband content. The method includes receiving content at a network operations center, associating promotional material with the content, scheduling the content on virtual channels, wherein the virtual channels are a Multicast IP stream, broadcasting the virtual channels over a transmission medium, receiving the virtual channels at a broadband ISP, routing requested virtual channels to a user machine, and displaying the content in the requested virtual channels on the user machine.

These advantages are achieved by, for example, a method of delivering personalized broadband content. The method includes receiving a plurality of virtual channels at a user machine, wherein each virtual channel comprises content, filtering the plurality of virtual channels based on a user's personal profile, displaying the filtered virtual channels in a GUI, wherein a virtual channel may be selected, and, if a virtual channel is selected, displaying or storing content from the virtual channel.

These advantages are achieved by, for example, a computer-readable medium including instructions for delivering personalized broadband content, by receiving a plurality of virtual channels at a user machine, wherein each virtual channel comprises content, filtering the plurality of virtual channels based on a user's personal profile, displaying the filtered virtual channels in a GUI, wherein a virtual channel may be selected, and, if a virtual channel is selected, displaying or storing content from the virtual channel.

These advantages are achieved by, for example, a system for delivering personalized broadband content. The system includes a network operations center ("NOC"), comprising one or more servers, that receives content and promotional material and schedules the content for broadcast on virtual channels, a transmission medium, operatively connected to the NOC, that transmits the virtual channels, a point-of-presence ("POP") client server that receives at least a subset of the virtual channels, and a user-machine, connected via a network to the POP client server, comprising client software that issues requests for virtual channels and processes the virtual channels to display the content and promotional materials on the user machine, wherein the POP client server routs virtual channels to the user machine based on the requests issued by the client software.

BRIEF DESCRIPTION OF THE FIGURES

The detailed description will refer to the following drawings, in which like numbers refer to like items, and in which.

DETAILED DESCRIPTION OF THE PREFERRED EMBODIMENTS

Figure 1:
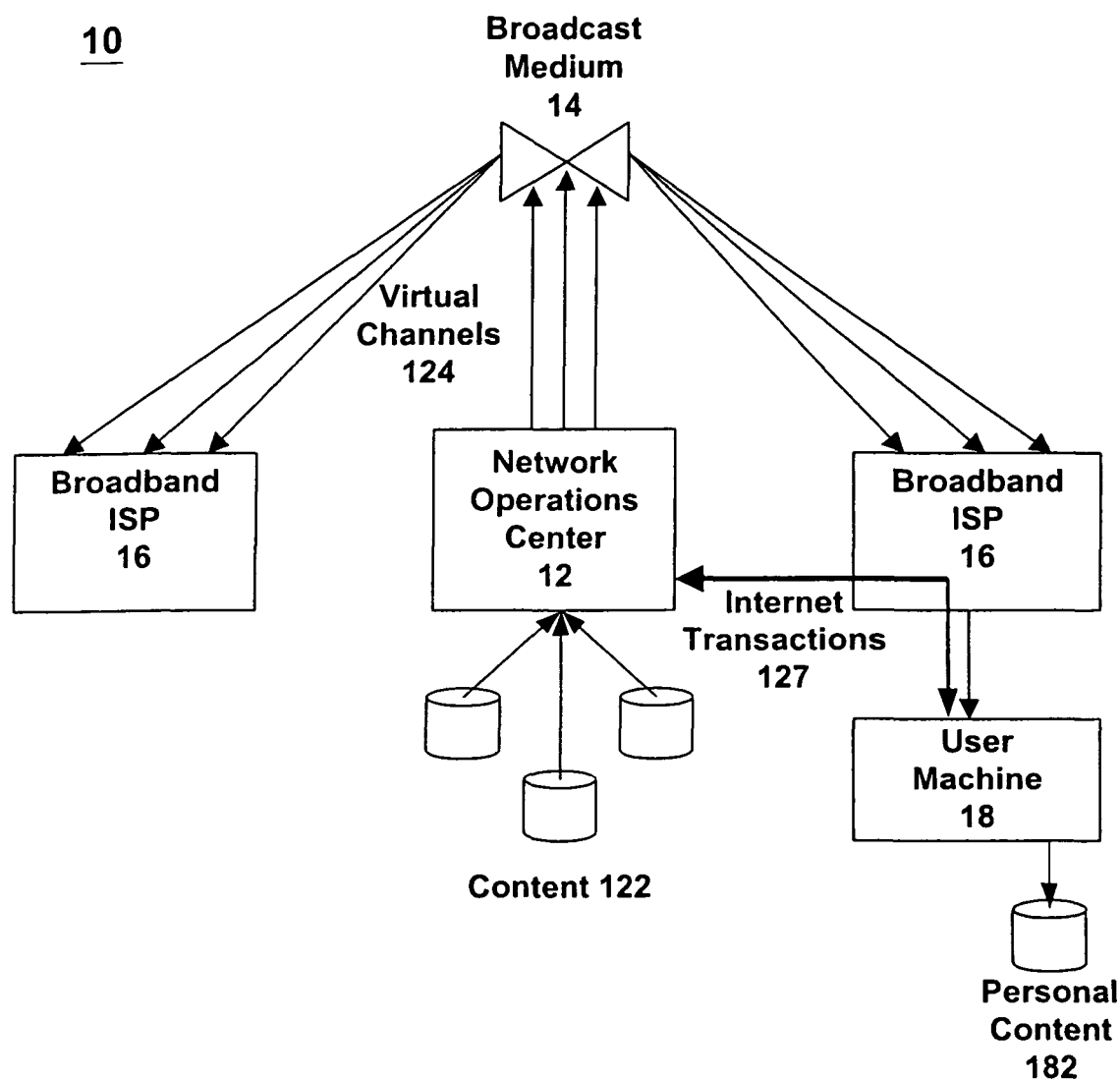
FIG. 1 is a block diagram overview of a system for delivering personalized broadband content.

FIG. 1 illustrates an embodiment of a system 10 for delivering personalized broadband content. As shown in FIG. 1, the system 10 preferably comprises a network operations center ("NOC") 12, a transmission medium 14, a broadband Internet Service Provider ("ISP") 16, and a user machine 18. In general operation, the NOC receives or retrieves content 122, processes and schedules the content 122 for transmission on virtual channels 124, transmits or broadcasts the virtual channels 124 over the transmission medium 14 to broadband ISPs 16, from which the virtual channels 124 (and hence, the content 122) are transmitted, based at least in part on user feedback, over a broadband connection (e.g., cable, DSL or T-x line) to the user machine 18, on which resides client software (the "client") 20 that processes received virtual channels 124 to display content to a user and to store content as the user's personal content 182.

The NOC 12 preferably comprises a plurality of servers, controllers, storage devices and other components that are generally responsible for the overall operations of the system 10. In a sense, the NOC 12 may also be thought of as a "headend" of the system 10. The NOC 12 preferably collects, aggregates and classifies content (e.g., video, audio and Web data) 122. The NOC 12 preferably assigns (e.g., based on the classification of the content) appropriate targeted advertising, e-commerce material and other promotional or commerce-related material (collectively, "assigned material") to the content 122.

A content scheduler application (not shown) of the NOC 12 preferably schedules the content (with the assigned material) 122 for transmission on the virtual channels 124. Each virtual channel 124 preferably has a "main" video (or audio) component that is the primary content stream. Each virtual channel 124 preferably can concurrently carry several multiplexed streaming sub-components and preferably includes an integrated file transfer capability. Therefore, advertising and other promotional material, as one sub-component, may be associated with the primary content stream or main component, by synchronizing the advertising with the broadcast content on one virtual channel at run time (when the virtual channel is created and broadcast), leaving the primary content stream unaltered. For example, the primary content stream may have known commercial breaks; the content scheduler preferably synchronizes the advertising with the commercial breaks so that the virtual channel displays the advertising during these commercial breaks. Consequently, preprocessing (authoring) of the principal video or audio stream is not required to deliver multiple targeted advertising streams in tandem.

The NOC 12 also generates special low-bandwidth virtual channels 124 referred to as "control channels." The control channels are preferably configured to continually broadcast content 122 programming information. The control channels preferably also carry client 20 graphical user interface ("GUI") updates ("skins"). As discussed below, the client 20 may present received content 122 and the content 122 programming information to the user with GUIs. The GUI skins may be used to brand and personalize the GUIs, including material displayed in banners and other locations of the GUIs. By dynamically updating the GUI skins, the system 10 provides flexibility in both branding and personalization as well as supporting the insertion of targeted advertising and e-commerce opportunities with the GUI itself (e.g., in GUI banners).

Further, the control channel 126 preferably delivers, among other things, an event database and a java applet. The java applet, preferably executed by the client 20, preferably reads a user personal profile and event database in order to display a dynamic GUI. The control channel 126 may also feed a rich media screen saver that provides information about content 122, adverting and e-commerce opportunities on a user's screen saver.

The NOC 12 preferably packages the virtual channels 124 as Internet Protocol ("IP") Multicast streams and then delivers them via the transmission medium 14 (e.g., satellite) to the broadband ISPs 16 at the edge of the Internet. The broadband ISPs 16 are preferably enabled to receive and transmit high bandwidth (e.g., >kPs) content, providing the ISP subscribers with high bandwidth service. Preferably, point-of-presence ("POP") client servers (not shown) sitting on the backbone (not shown) of the broadband ISPs 16 receives the virtual channels 124. The POP client servers preferably act primarily as gateway Multicast routers, propagating requested virtual channels 124 (multicast streams) over the ISP's 16 backbone, and on to the user machines 18. The POP client servers may propagate virtual channels 124 as determined based on, e.g., user feedback, advertising and e-commerce hits and viewing habits (collectively, "user feedback").

The client 20 on the user machine 18 preferably transmits user feedback, including advertising and e-commerce hits generated by the user on the user machine 18 to the NOC 12 via, e.g., the Internet or other transmission medium. The client 20 may transmit this information in response to requests from the NOC 12 or as scheduled. The NOC 12 preferably records this information in a transaction database (not shown) located at the NOC 12.

Figure 2A:
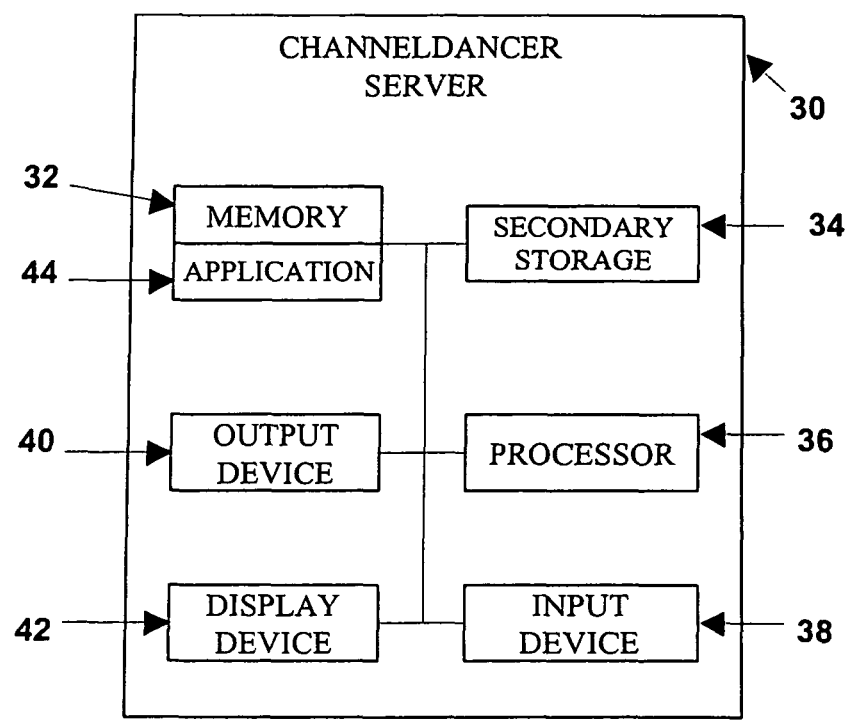
FIGS. 2a and 2b are block diagrams illustrating exemplary hardware for servers and user machines of the system for delivering personalized broadband content.

FIG. 2a is a block diagram illustrating exemplary hardware components for implementing the various servers of the system 10 for delivering personalized broadband content. For example, the exemplary hardware shown may be used to implement the servers of the NOC 12 or the POP client server. Server 30 typically includes a memory 32, a secondary storage device 34, a processor 36, an input device 38, a display device 40, and an output device 42. Memory 32 is preferably a computer-readable medium and may, include RAM or similar types of memory, and it may store one or more applications 44 for execution by processor 36. Secondary storage device 34 is preferably a computer-readable medium and may include a hard disk drive, floppy disk drive, CD-ROM drive, or other types of non-volatile data storage.

Processor 36 executes the application(s) 44, which is stored in memory 33 or secondary storage 34, or received from the Internet or other network. Input device 38 may include any device for entering information into server 30, such as a keyboards mouse, cursor-control device, touch-screen, microphone, digital camera, video recorder or camcorder. Display device 40 may include any type of device for presenting visual information such as, for example, a computer monitor or flat-screen display. Output device 42 may include any type of device for presenting a hard copy of information, such as a printer, and other types of output devices include speakers or any device for providing information in audio form. Server 30 may store a database structure in secondary storage 34, for example, for storing and maintaining such information as described herein.

Also, processor 36 may execute one or more software applications 44 in order to provide the functions described in this specification, and the processing may be implemented in software, such as software modules, for execution by computers or other machines, such as the user machine.

Figure 2B:
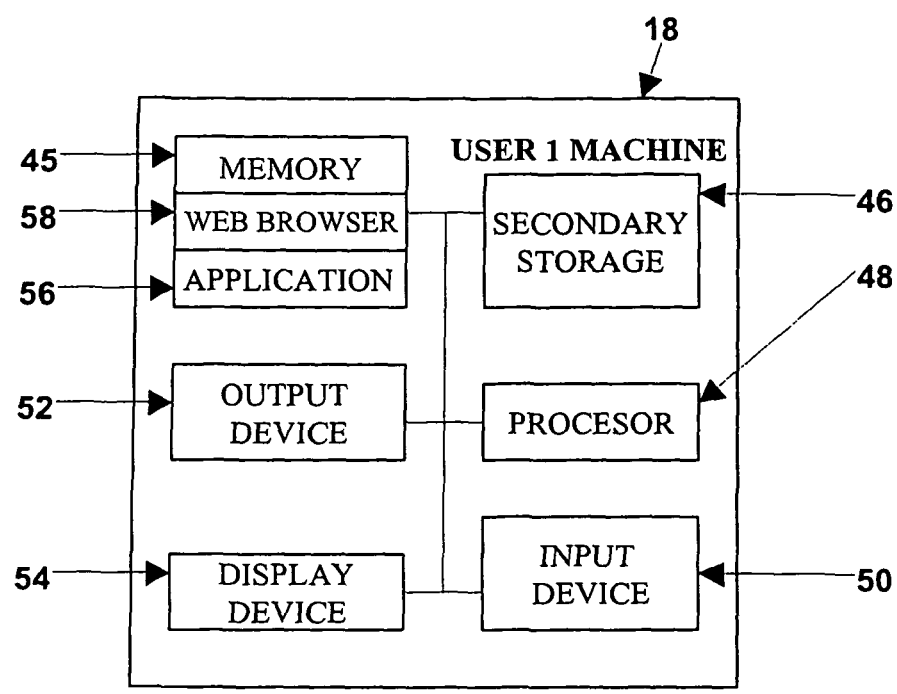

FIG. 2b illustrates typical components of a user machine 18 used by a user. User machine 18 typically includes a memory 45, a secondary storage device 46, a processor 48, an input device 50, a display device 52, and an output device 54. Memory 45 is preferably a computer-readable medium and may include random access memory (RAM) or similar types of memory, and it may store one or more applications 56 (may include application(s) 44 received from server), including the client 20, and a web browser 58, for execution by processor 48. Secondary storage device 50 is preferably a computer-readable medium and may include a hard disk drive, floppy disk drive, CD-ROM drive, or other types of non-volatile data storage. Processor 48 may execute applications 56 (and/or 44) or programs stored in memory 45 or secondary storage 46, or received from the Internet or other network (not shown). For example, the processor 48 preferably executes the client 20 in order to provide the client functions described herein.

Input device 50 may include any device for entering information into user machine 18, such as a keyboard, mouse, cursor-control device, touch-screen, microphone, digital camera, video recorder or camcorder. Display device 52 may include any type of device for presenting visual information such as, for example, a computer monitor or flat-screen display. Output device 54 may include any type of device for presenting a hard copy of information, such as a printer, and other types of output devices include speakers or any device for providing information in audio form.

Web browser 58 is used to display the dynamic GUIs described herein. Examples of web browsers include the Netscape Navigator program and the Microsoft Internet Explorer program. Any web browser, co-browser, or other application capable of retrieving content from a network and displaying pages or screens may be used.

Examples of user machines 18 include personal computers, laptop computers, notebook computers, palm top computers, network computers, wireless devices, or any processor-controlled device capable of executing a web browser or other type of application for interacting with the system.

Although only one server 30 is shown, the servers described herein may use multiple servers 30 as necessary or desired and may also use back-up or redundant servers to prevent network downtime in the event of a failure of a particular server. In addition, although machine 18 and server 30 are depicted with various components, one skilled in the art will appreciate that the user machines 18 and the server 30 can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system, such as user machine 18 and server 30, or other device, to perform a particular method (e.g., such as the methods described herein).

Figure 3:
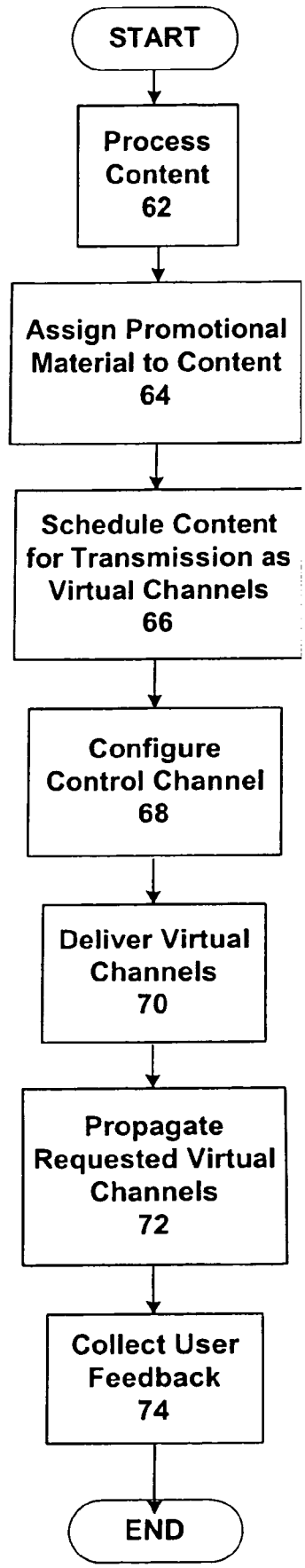
FIG. 3 is a flowchart of a method for delivering personalized broadband content.

FIG. 3 is a flowchart illustrating a method 60 of delivering personalized broadband content. The method 60 preferably comprises: processing content 62, assigning promotional material to content 64, scheduling content for transmission as virtual channels 66, configuring a control channel 68, delivering virtual channels 70, propagating requested virtual channels 72 and collecting user feedback 74. Processing content 62 preferably comprises collecting, for example, audio, video and Web data, aggregating the audio, video and Web data together, and classifying the audio, video and Web data. The content 122 is preferably collected from a variety of sources and collecting may comprise receiving or retrieving the content 122 from external sources or from internal sources (e.g., content databases). Aggregating may comprise storing received or retrieved content 122 in a NOC 12 data repository (not shown), assigning the content 122 an expiration date, reviewing content to assure adherence to standards required for NOC 12 processing operations, and/or assigning live feeds directly to a specific channel controller (not shown) for inclusion in a specific virtual channel 124. Classifying the content 122 may comprise assigning each item of content 122 a particular class or category based on pre-determined guidelines. For example, all live sports may be assigned a class "live-sports" and a Monday Night Football™ game a subclass "live professional football".

Assigning promotional material to content 64 preferably comprises assigning appropriate targeted advertising, e-commerce material and other promotional or commerce-related material (collectively, "assigned material") to the content 122. The appropriateness of the assigned material may be determined by the classification of the content 122 and the correlation of the assigned material to that classification. For example, a beer commercial may be targeted advertising for the class "live-sports" and especially the sub-class "live professional football." Therefore, the beer commercial is appropriate targeted advertising for the Monday Night Football™ content.

Scheduling content for transmission as virtual channels 66 preferably comprises assigning content, and assigned material, on virtual channels 124 so as to efficiently transmit the content. For example, "live-sports" content may be grouped together on one or more virtual channels 124 to minimize the number of virtual channels that are transmitted to a user requesting or being targeted with "live-sports" content.

Configuring a control channel 68 preferably comprises creating a low-bandwidth virtual channel 124 with information comprising a description of the content 122 scheduled on the virtual channels 124 and a description of each virtual channel 124. The control channel is preferably continually transmitted and updated so as to contain accurate and up-to-date information on the content 122 and the virtual channels 124 being broadcast at present and in the future. Configuring a control channel may also comprise loading GUI skins on the control channel so GUI skin updates may be transmitted to the user machine 18.

Delivering virtual channels 70 preferably comprises transmitting the virtual channels 124 to the broadband ISP 16. Delivering preferably comprises packaging the virtual channels 124 as IP Multicast streams and transmitting the virtual channel 124 IP Multicast streams via the transmission medium 14 (e.g., satellite) to broadband ISPs 16. Propagating requested virtual channels 72 preferably comprises transmitting virtual channels 124 that have been requested by the client 20 or that are being targeted to the user via a broadband connection to the user machine 18. The client 20 may request virtual channels 124 that the user has specified or that fit some criteria predetermined by the user (e.g., such as a personal profile) or that are determined by user feedback.

Collecting user feedback 72 preferably comprises the NOC 12 receiving user feedback from the user machine 18. The client 20 may transmit the user feedback as requested or polled by the NOC 12 or at regularly scheduled intervals, for example. The user feedback is preferably transmitted via the Internet, but other transmission mediums may be used.

Figure 4:
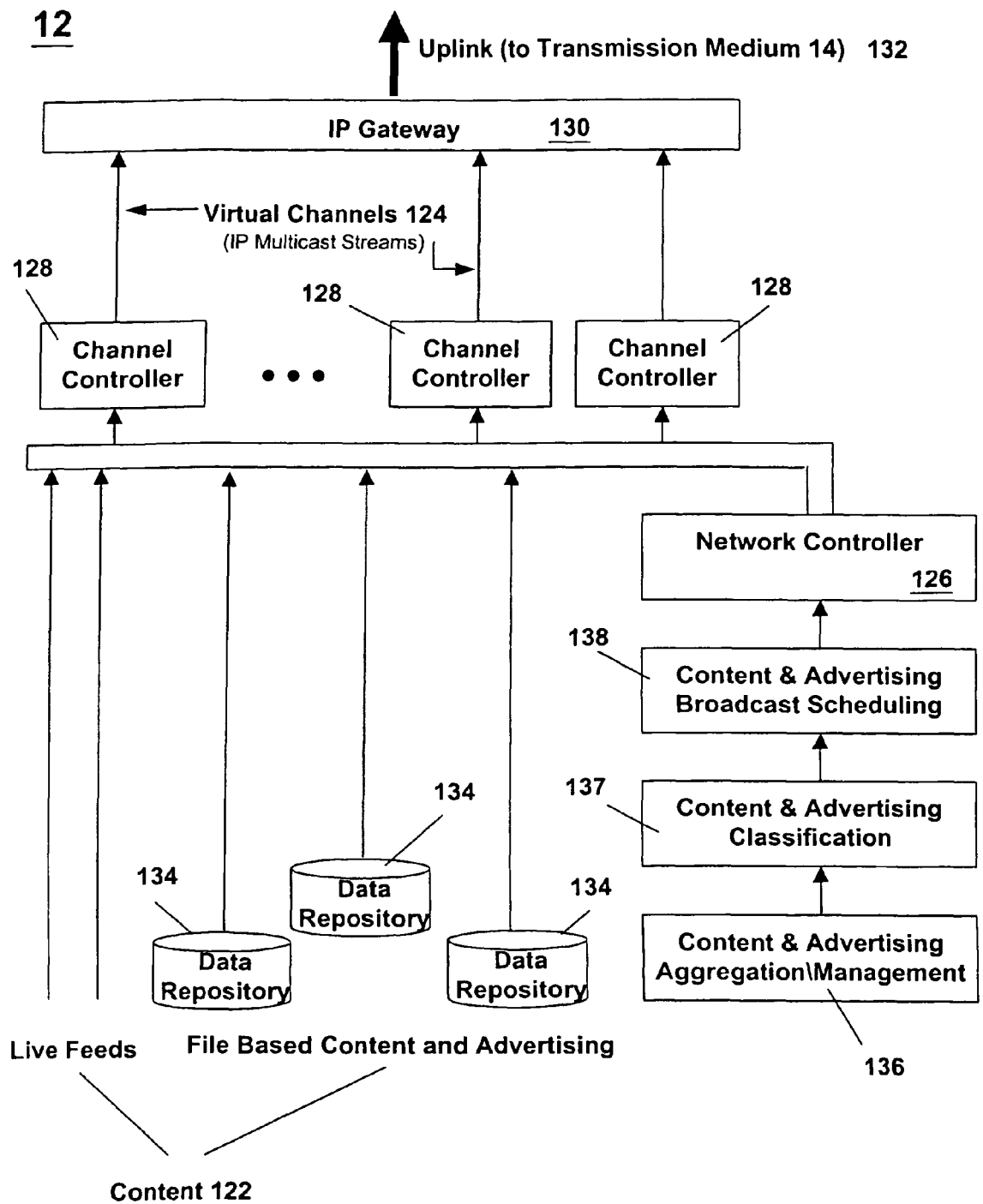
FIG. 4 is a block diagram illustrating a NOC and operation of the NOC in detail.

FIG. 4 illustrates various components of the NOC 12 and depicts operations of the NOC 12. As shown, the NOC 12 preferably comprises a network controller 126, a plurality of channel controllers 128, an IP gateway 130, an uplink 132 and one or more data repositories 134. As mentioned above, the NOC 12 preferably also comprises a NOC server (not shown in FIG. 4) that runs various software applications, as represented by the following software modules: a content & advertising aggregation\management module 136; a content & advertising classification module 137; and, a content & advertising broadcast scheduling module 138 (i.e., the content scheduler 138). Content 122 preferably includes computer file-based material as well as live video/audio streams (e.g., IP, digital or analog streams), although content may include video, audio, text and other material from a variety of sources (e.g., recorded material such as video and audio tapes, DVDs, CDs, taped-delay audio/video streams, off-air broadcast content). Advertising, e-commerce and other promotional material (collectively, "promotional material") may be considered a subset of content 122.

Content 122, with or without related promotional material, preferably is retrieved from or dropped off by partner content providers or otherwise received from a content provider or source. The content and advertising aggregation\management module 136 preferably registers the file-based content 122 in a data repository 134 and assigns the file-based content 122 a content expiration date. The content expiration date is generally a date on which the file-based content 122 is considered out-of-date, redundant, superceded, or past the content's usefulness, although the expiration date may also be arbitrarily chosen. The expiration date enables an ongoing auto-cleanup procedure of the NOC data repository 134 (e.g., deleting all content 122 with an expired expiration date). The content and advertising aggregation\management module 136 preferably also reviews and processes promotional material to ensure adherence to standards required for NOC transaction processing operations. For example, these standards may include hypertext markup language ("HTML") templates that incorporate "hooks" used by the client 20 to link to backoffice operations (e.g., NOC 12 operations that track e-commerce purchases or advertising clicks, as described below with reference to FIG. 17) to which the promotional material should conform (i.e., the promotional material includes these templates). The content and advertising aggregation\management module 136 preferably assigns live (and taped-delay) feeds directly to a channel controller 128 for inclusion as a component of a specific virtual channel 124.

Figure 5:
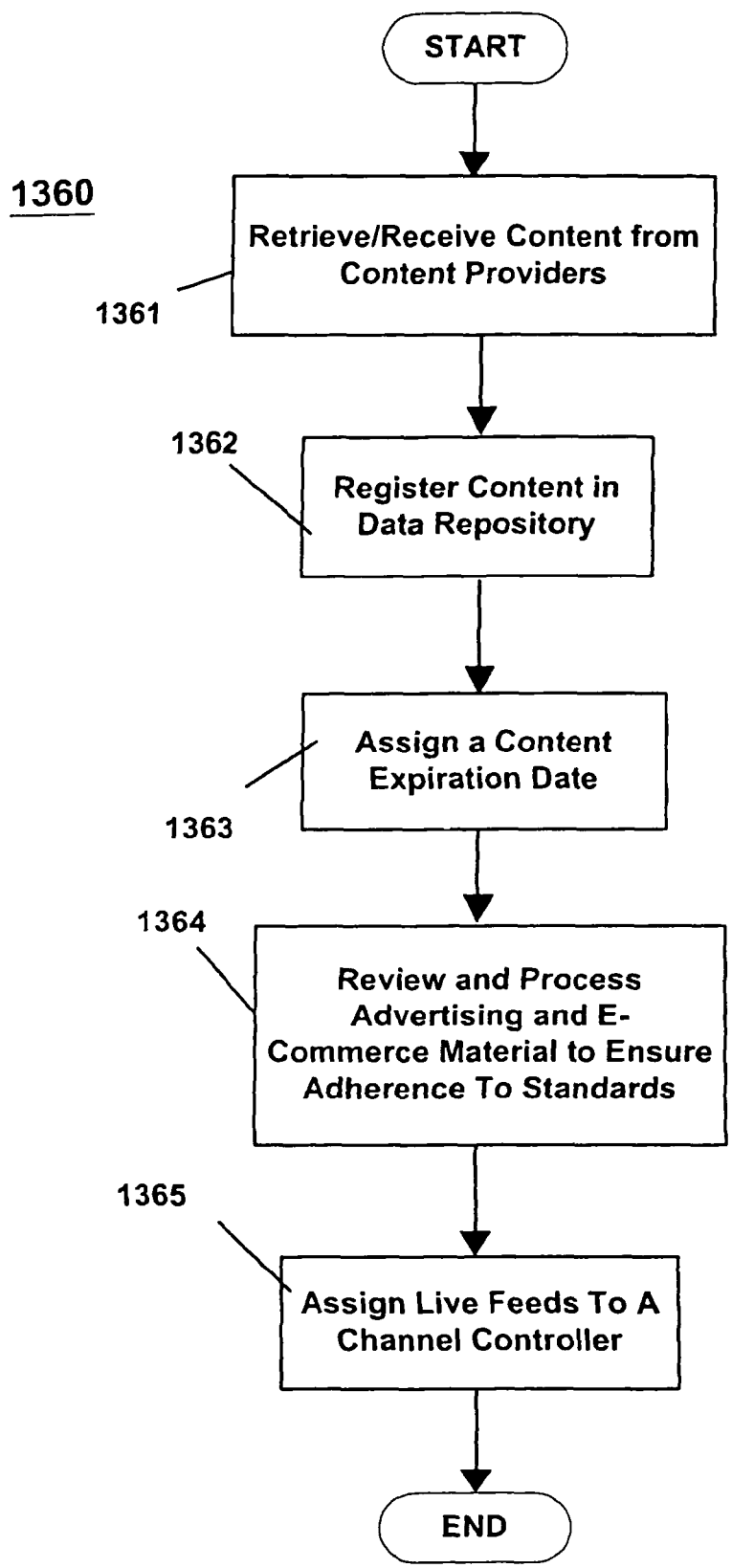
FIG. 5 is a flowchart of a method of content and advertising aggregation and management.

FIG. 5 is a flowchart illustrating an exemplary method 1360 of content and advertising aggregation and management. The method 1360, preferably executed by the content and advertising aggregation\management module 136 as described above, comprises receiving/retrieving content from content providers 1361, registering content in data repository 1362, assigning a content expiration date 1363, reviewing and processing advertising and e-commerce material to ensure adherence to standards 1364 and assigning live feeds to a channel controller 1365.

Referring again to FIG. 4, the content and advertising classification module 137 preferably classifies the content 122 and promotional material so that the content 122 and promotional material may be targeted or filtered for users based on user personal profiles, feedback or other criteria. The content and advertising module preferably classifies content 122 according to parameters that enable a preference-based filtering through all intelligent application of a user's personal profile by the client 20. The personal profile preferably includes various descriptive data about the user and the user's content preferences and may be created through question and answer sessions or other feedback, such as viewing/listening habits and content hits and may be dynamically updated to reflect changes in the user's preferences. The classification parameters are preferably defined to correspond to classification parameters of the personal profile. For example, live sports content receives a classification that corresponds to a classification in the personal profile of a user that prefers live sports. The content and advertising module may classify content 122 with classes and sub-classes to reflect specific sub-categories of a general category (e.g., a professional football game in a class "live sports", sub-class "professional football game") and/or to show that the content 122 fits within multiple categories and/or sub-categories. What is the nature of the content (i.e., whether a movie, a sports event, a infomercial, a news program, a weekly program, etc.) may be determined, for example, automatically from a content title or descriptor (e.g., a numeric code) encoded with the content or by a human operator that examines a description of the content, a content title or the content itself. Once this is determined, known methods of content classification may be used.

The content and advertising classification module 137 preferably classifies promotional materials according to demographic parameters that enable the targeting of one of several concurrently delivered advertising streams towards a user (e.g., based on personal profile). The promotional materials may be received with related content, as described above, or unassociated with other content. The demographic parameters are defined to correspond with the demographics of users so that advertising and e-commerce designed for users with certain demographics are targeted and sent the targeted promotional materials. For example, a beer ad designed for 25 to 35 year-old males is preferably classified accordingly. What is the nature of the promotional material (e.g., a beer commercial, an infomercial, an e-commerce opportunity) and for what users the promotional material is designed may be determined, for example, automatically from a title or descriptor (e.g., a numeric code) encoded with the promotional material or by a human operator that examines a description of the promotional material, a promotional material title or the promotional material itself. Once this is determined, known methods of promotional material classifying may be used.

Figure 6:
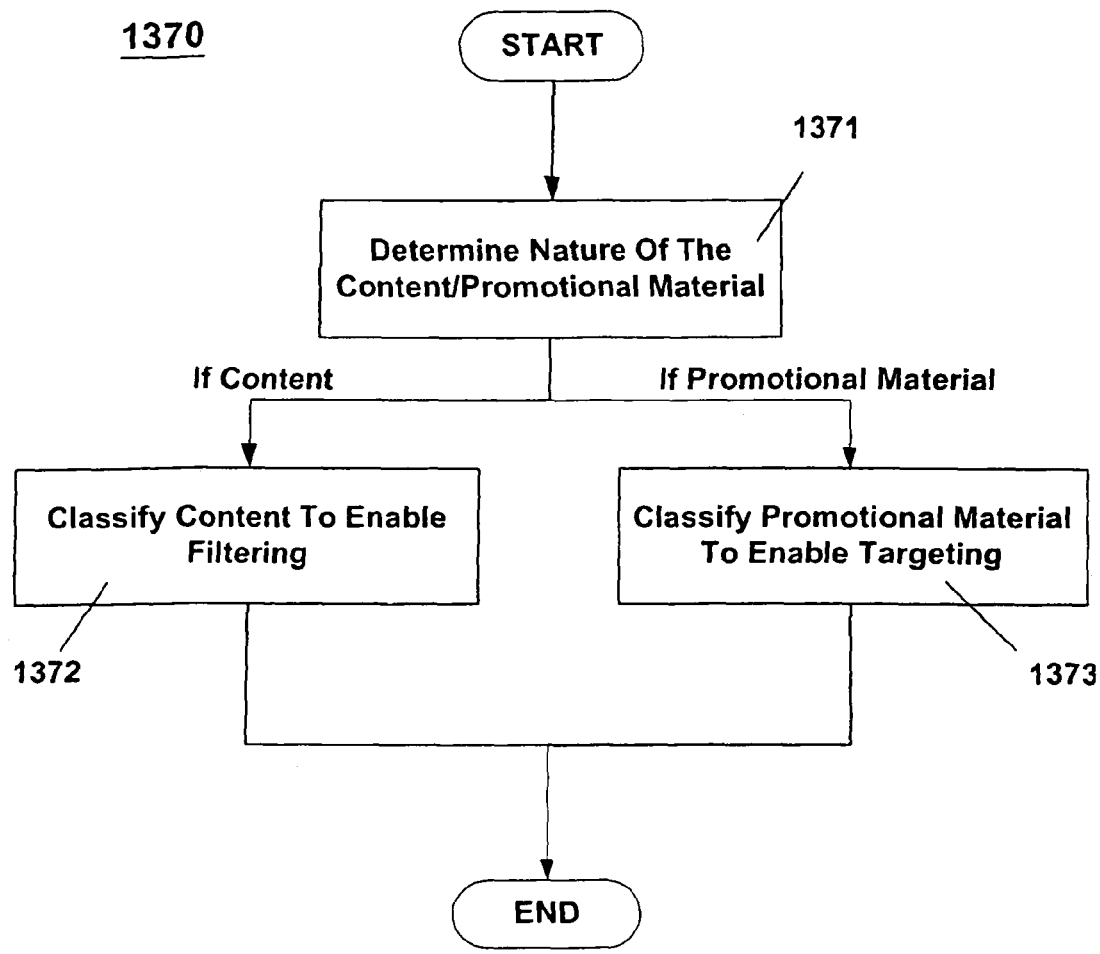
FIG. 6 is a flowchart of a method of content and advertising classification.

FIG. 6 is a flowchart illustrating an exemplary method 1370 of content and advertising classification. The method 1370, preferably executed by the content and advertising classification module 137 as described above, preferably comprises determining the nature of the content/promotional material 1371, classifying content to enable filtering 1372 or classifying promotional material to enable targeting 1373.

Referring again to FIG. 4, the content scheduler 138 is preferably responsible for the ongoing program scheduling of content 122 across virtual channels 124. The content scheduler 138 preferably schedules content 122 and related promotional materials for inclusion as part of a virtual channel 124 that supports concurrent broadcast of multiple subcomponents, including video and audio streams, as well as files. The content scheduler 138 dynamically determines the scheduling of content 122 and promotional materials based on a variety of criteria. For example, the content scheduler 138 may schedule content 122 of one classification (e.g., live sports) together on one or more virtual channels 124. Likewise, the content scheduler 138 may schedule content 122 provided from one content source together on one or more virtual channels 124. Further, the content scheduler 138 may schedule content 122 based on the bandwidth necessary to receive the content 122 (e.g., scheduling high bandwidth content together). Once the content scheduler 138 determines on which virtual channel 124 to schedule certain content 122, the content scheduler 138 preferably scheduled the content by sending real-time commands to the network controller 126 in order to provide process control of the channel controllers 128, which are responsible for the actual production of a virtual channel 124.

Figure 7:
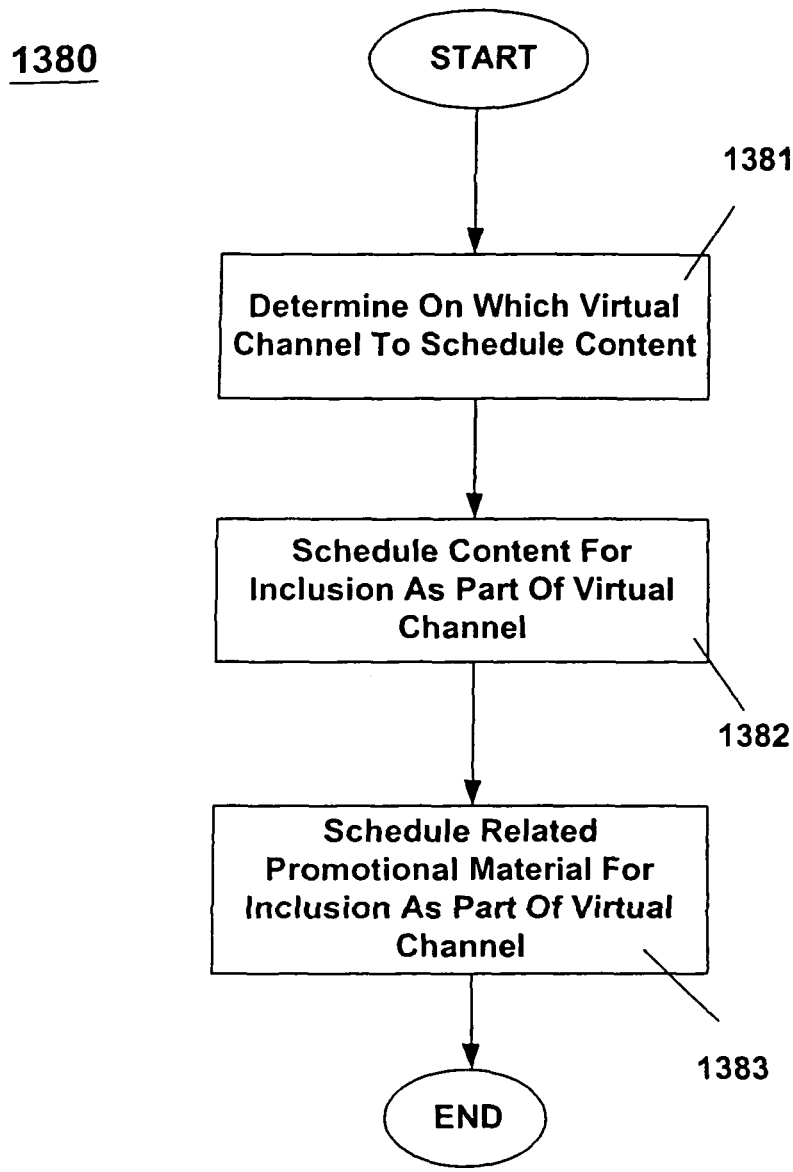
FIG. 7 is a flowchart of a method of content and advertising scheduling.

FIG. 7 is a flowchart illustrating an exemplary method 1380 of content & advertising broadcast scheduling. The method 1380, preferably executed by the content scheduler 138 as described above, preferably comprises: determining on which virtual channel to schedule content 1381; scheduling the content for inclusion as part of a virtual channel 1382; and, scheduling related promotional materials for inclusion as part of the virtual channel 1383. As noted above, the determining step 1381 may be based on a variety of criteria. In this example, promotional material related to the scheduled content is also scheduled on the same virtual channel 124. Alternatively, the promotional material, whether related or not, may be scheduled on a different virtual channel 124 (e.g., on a promotional material-only virtual channel that is linked to the content 122 by the client 20 at the user machine 18).

Referring again to FIG. 4, the network controller 126 is preferably a server-based software application package that provides top level network management functionality and that is responsible for controlling other components of the NOC 12. For example, the network controller 126 preferably issues instructions/commands to the channel controllers 128, directing the operation of the channel controllers 128 and the dynamic configuration of the virtual channels 124. The network controller 126 may accomplish the dynamic configuration by maintaining an open Transmission Control Protocol/Internet Protocol ("TCP/IP") connection to each individual channel controller 128, issuing basic instructions/commands that activate or deactivate content 122 subcomponents, thereby defining the composition of the virtual channel 124. The network controller 126 preferably also issues a system-wide clock pulse that ensures timing synchronization across virtual channels 124.

Figure 8:
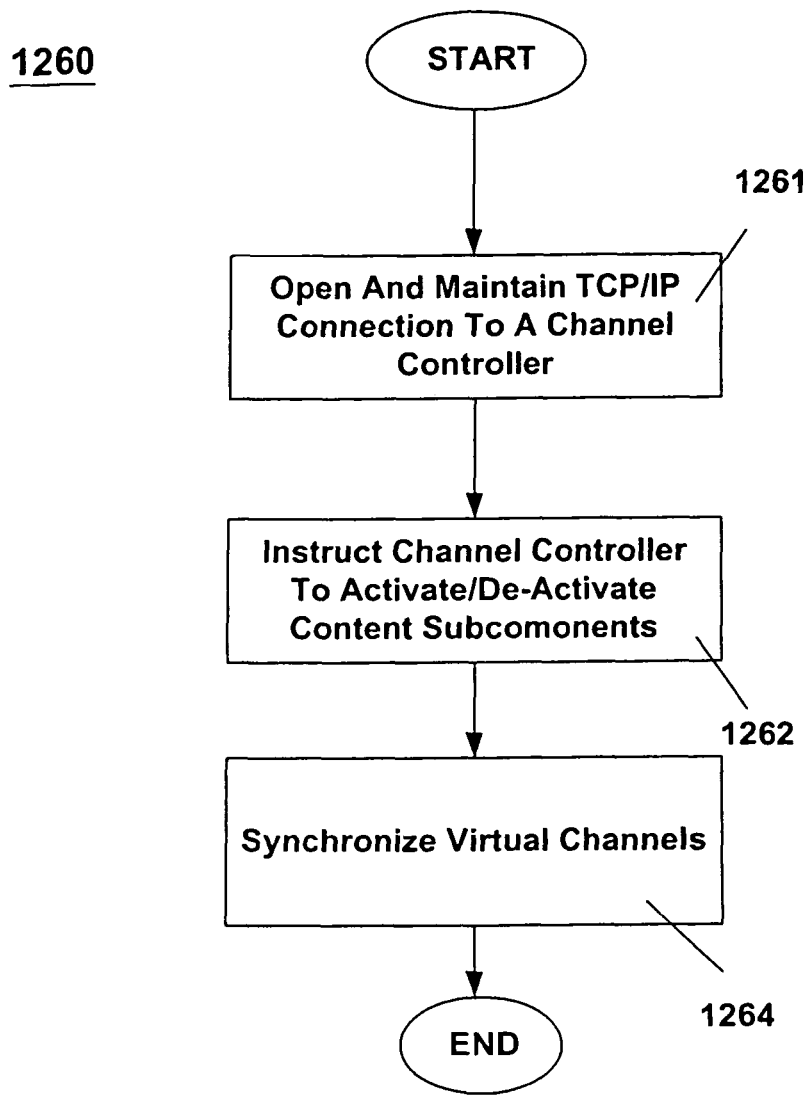
FIG. 8 is flowchart of a method of network controller operation.

FIG. 8 is a flowchart illustrating an exemplary method 1260 of network controller operation. The method 1260, preferably executed by the network controller 126 as described above, preferably comprises: opening and maintaining a TCP/IP connection to a channel controller 1261; instructing the channel controller to activate or de-activate content subcomponents 1262; and synchronizing virtual channels 1263.

Figure 9:
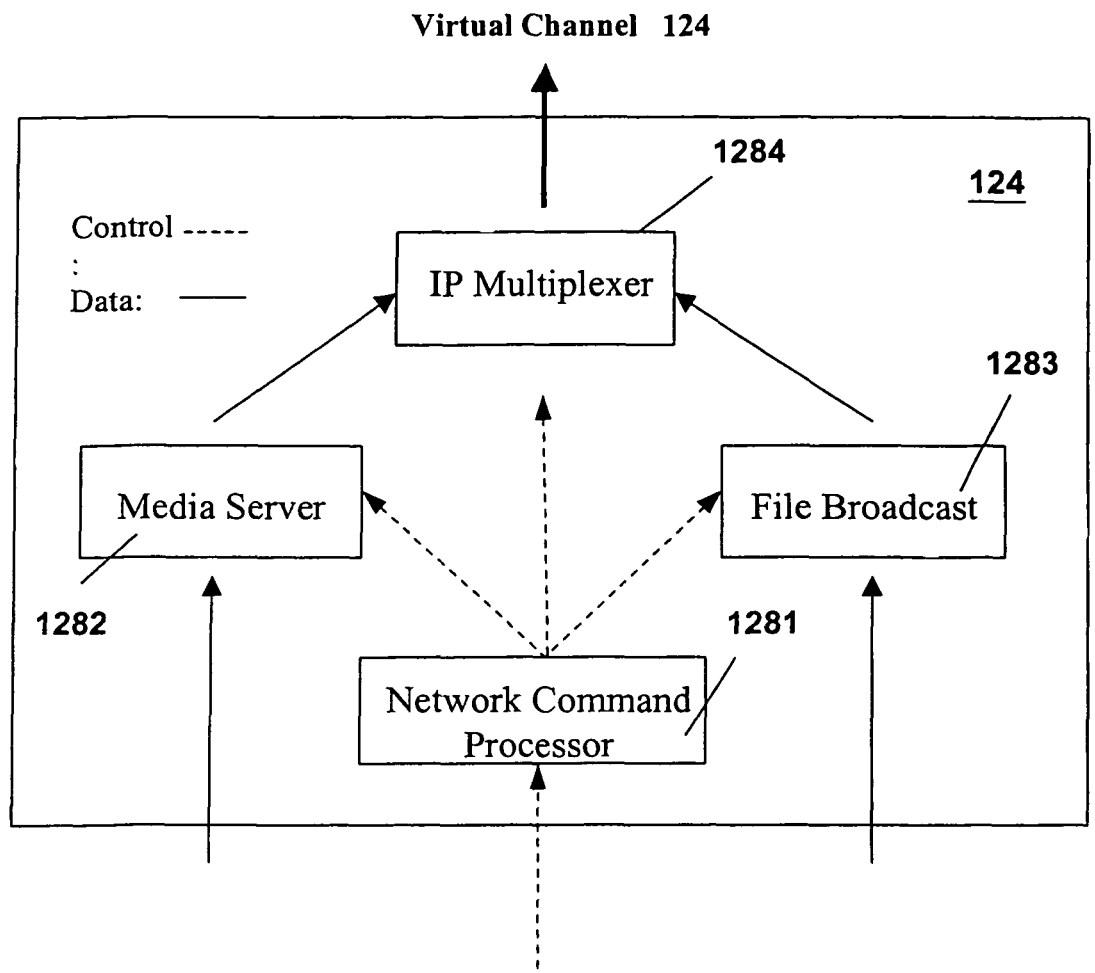
FIG. 9 is a block diagram illustrating a channel controller component and operation of the channel controller.

FIG. 9 is a block diagram illustrating a channel controller 128 and operation of the channel controller 128. The channel controller 128 preferably is a software application package that manages coordination of the various components used for the creation and transmission of an individual virtual channel. Hence, the channel controller preferably comprises the following modules: a network command processor 1281; a media server 1282; a file broadcast module 1283; and, a IP multiplexer 1284. The network command processor 1281 preferably accepts instructions/commands from the network controller 126 to drive the operation and interaction of the other modules. The media server 1282, e.g., a Microsoft™ ("MS") Media Server or RealNetworks, Inc.™ Server, preferably produces a real-time Multicast IP stream suitable for play by a media player (not shown in FIG. 9), e.g., a MS Media Player or RealPlayer™. For example, the media server 1282 stream may be an active streaming format ("ASF") formatted user datagram protocol/internet protocol ("UDP/IP") suitable for the MS Media Player or a Realtime Streaming Protocol ("RTSP") suitable for the RealPlayer. The media server 1282 stream is generated from content 122 transmitted to the channel controller. For example, the media server 1282 stream may be generated from a file source (e.g., from the data repository 134) or from a live or tape-delayed feed, such as an analog feed with the assistance of an encoder (not shown) that encodes the analog feed for digital transmission.

The file broadcast module 1283, e.g., a CacheStream XD™ ("extreme datacasting") file broadcast module, preferably provides for the file transfer subcomponent of the virtual channel 124, enabling files to be transfer via the virtual channel 124 to a user machine 18. The file broadcast module preferably receives files and converts them to a stream. The file broadcast module preferably outputs the stream via a TCP/IP connection to the IP multiplexer 1284; the TPC/IP connection provides flow control to any actual file transfer process.

The IP multiplexer 1284, e.g., a Cachestream CMX IP-Mux™ ("channel manager extreme"), preferably combines the streams produced by the media server 1282 and the file broadcast module 1283 configures the combined streams into a single output IP multicast stream from the channel controller 128. The IP multiplexer 1284 preferably encrypts the output IP multicast stream and protects the output stream, e.g., by forward error correction. As shown in FIG. 9, preferably each output IP multicast stream is a virtual channel 124.

Referring again to FIG. 4, the output multicast IP streams from each channel controller 128 preferably flow over a NOC 12 local area network ("LAN") to the IP Gateway 130. The IP Gateway 130 may be a third party commercial product, such as SkyStream's IP Gateway™. The IP Gateway 130 forwards the virtual channels 124 to the uplink 132. The uplink 132 is connected to the transmission medium 14 and may be, for example, a satellite uplink.

Figure 10:
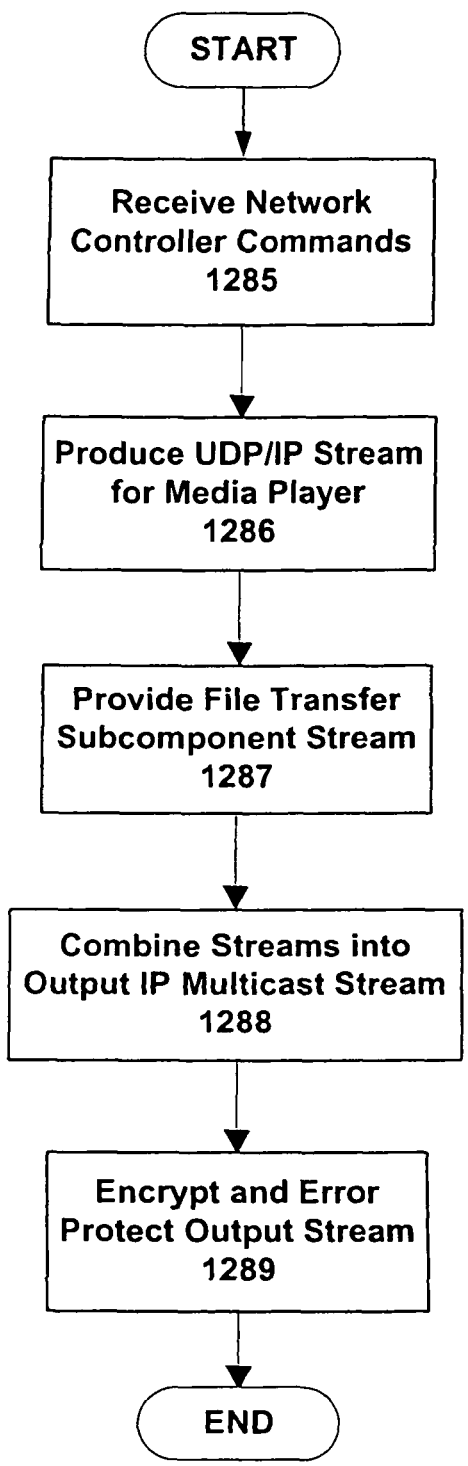
FIG. 10 is a flowchart of a method of channel controller operation at the NOC.

FIG. 10 is a flowchart illustrating an exemplary method 1280 of channel controller operation. The method 1280, preferably executed by a channel controller 128 as described above, preferably comprises: receiving network controller commands 1285; producing a media server stream for a media player 1286; providing file transfer subcomponent stream 1287; combining streams into an output IP multicast stream 1288; and, encrypting and error protecting the output stream 1289. The stream produced for the media player in the producing step 1286 may be a different format (e.g., not ASF) and type (e.g., not UDP/IP) then that described herein, as determined by available media players in use on user machines 18.

Figure 11:
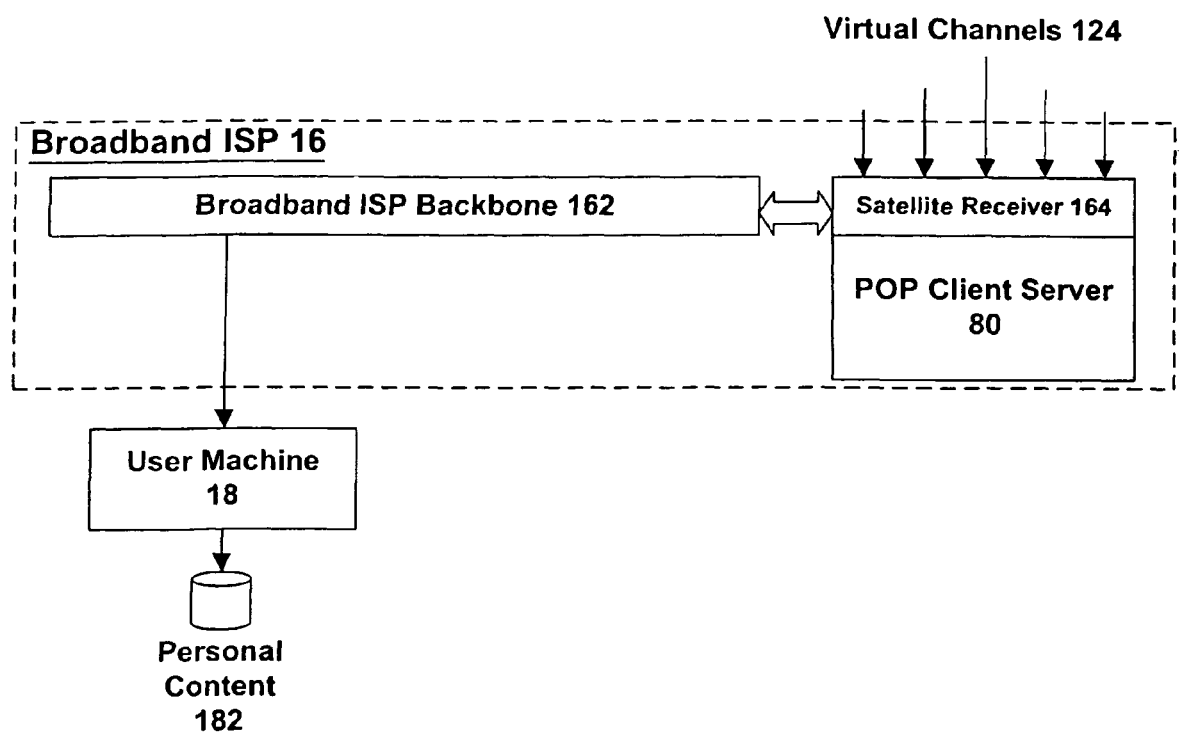
FIG. 11 is a block diagram of components of and operation of a POP client server of the system for delivering personalized broadband content.

Referring to FIG. 1, as discussed above, the NOC 12 delivers virtual channels 124 via the transmission medium 14 (e.g., satellite) to the broadband ISPs 16 at the edge of the Internet. The broadband ISPs 16 are preferably enabled to receive and transmit high bandwidth (e.g., >kPs) content, providing the ISP subscribers with high bandwidth service. Broadband ISPs 16 may include, for example, companies providing high bandwidth access via digital cable lines, DSL, T-x lines or Ethernet. FIG. 11 illustrates an exemplary broadband ISP 16 comprising a broadband ISP backbone 162, a receiver 164, and a POP client server 80. The broadband ISP backbone 162 preferably handles the major communication traffic of the broadband ISP 16. The receiver 164 (e.g., a satellite receiver) preferably receives the virtual channels (IP multicast streams) 124 from the transmission medium 14.

The POP client server 80 preferably sits on the broadband ISP backbone 162. The POP client server 80 preferably receives the virtual channels 124 received by the receiver 164 and is preferably configured to capture a subset of, or all, virtual channels 124 broadcast from the NOC 12. The POP client server 80 may be located elsewhere (i.e., separate from the broadband ISP 16) and may receive the virtual channels 124 directly (e.g., from the transmission medium 14 or the NOC 18). The POP client server 80 preferably acts primarily as a simple Multicast router, propagating those virtual channels 124 that have actually been requested by at least one client 20, over the broadband ISP backbone 162 for transmission to user machines 18. The POP client server 80 preferably also supports a utility application that allows each individual client 20 to assess the client's host user machine 18 link speed (i.e., bandwidth capacity) to the POP client server 80 upon startup. The link speed is preferably used to determine the availability of certain virtual channels 124 for the user machine 18. For example, if a certain virtual channel 124 contained content requiring a bandwidth greater then the bandwidth capacity of a user machine 18, the user machine would not receive that virtual channel 124.

Figure 12:
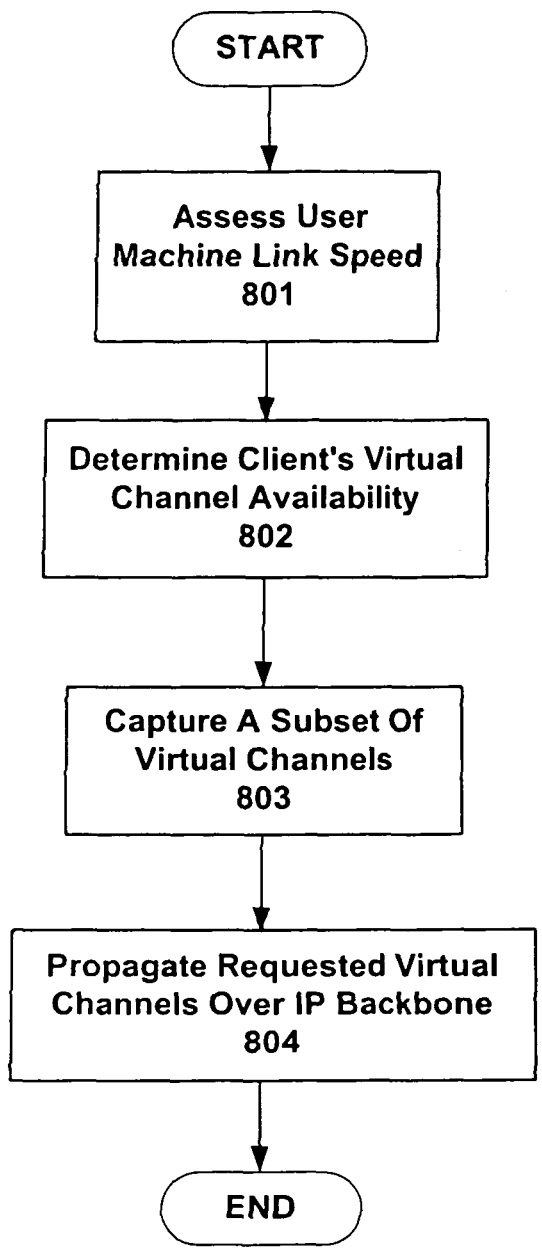
FIG. 12 is a flowchart of a method of POP client server operation.

FIG. 12 is a flowchart illustrating an exemplary method 800 of POP client server operation. The method 800, preferably executed, at least in part, by the POP client server 80 as described above, preferably comprises: assessing user machine link speed 801; determining client's virtual channel availability 802, capturing a subset of virtual channels 803; and, propagating requested virtual channels over IP backbone 804. The assessing step 801 and/or determining step 802 may be performed by, or in cooperation with, the client 20 of the user machine 18 being assessed. For example, the assessing step 801 may comprise the client 20 sending a request for link speed assessment upon startup on the user machine 18, the POP client server 80 transmitting test packets of varying bandwidths to the user machine 18, the client 20 reporting the transmission times for the test packets to the POP client server 80, and the POP client server 80 calculating the bandwidth capacity of the user machine 18 from this information. Virtual channels 124 that required a bandwidth exceeding this bandwidth capacity may then be determined to be outside the client's 20 available virtual channels 124. The subset of virtual channels 803 may be determined by the bandwidth capacity of all user machines 18 serviced by a broadband ISP 16. For example, if the bandwidth capacity of all user machines 18 of a broadband ISP 16 is below a level required by certain virtual channels 124, the POP client server 80 may not capture these certain virtual channels 124 in the capturing step 803.

Each user machine 18 that receives virtual channels 124 from the POP client server 80 preferably hosts a client 20, as described above. The client 20 is preferably a software package that incorporates Internet browser and media player (e.g., MS IE and Media Player) technologies in order to provide flexibility in personalized selection and presentation of the multidimensional media content 122 available from the virtual channels 124. The client 20 preferably continually scans the control channel (described above), which preferably delivers scheduling and classification information on programming carried by the virtual channels 124 available to the client 20. The client 20 preferably enables each individual user (e.g., family members) on a single user machine 19 to fill out a personal profile describing personal interests in content 122 as well as GUI theme (skin) preference.

Since the content 122 on the virtual channels 124 is preferably uniformly classified, the client 20 may apply, at the user's request or otherwise (e.g., as directed by the NOC 12 or the POP client server 80), a user's personal profile to filter the presentation of available programming to include content 122 specified as being of interest to the user. The client 20 may then present the filtered, personal content 182 (see FIG. 1) for selection, as a personalized view of available programming. Users may select the personal content 182 from across available virtual channels 124 for either immediate viewing or for caching—and future, on-demand access. The client 20 preferably continually monitors the ongoing allocation of disk resources and provides utilities and safeguards that allow each user to manage their personal disk cache. The client 20 preferably incorporates a "clean-up" feature that automatically deletes outdated or expired content.

Figure 13:
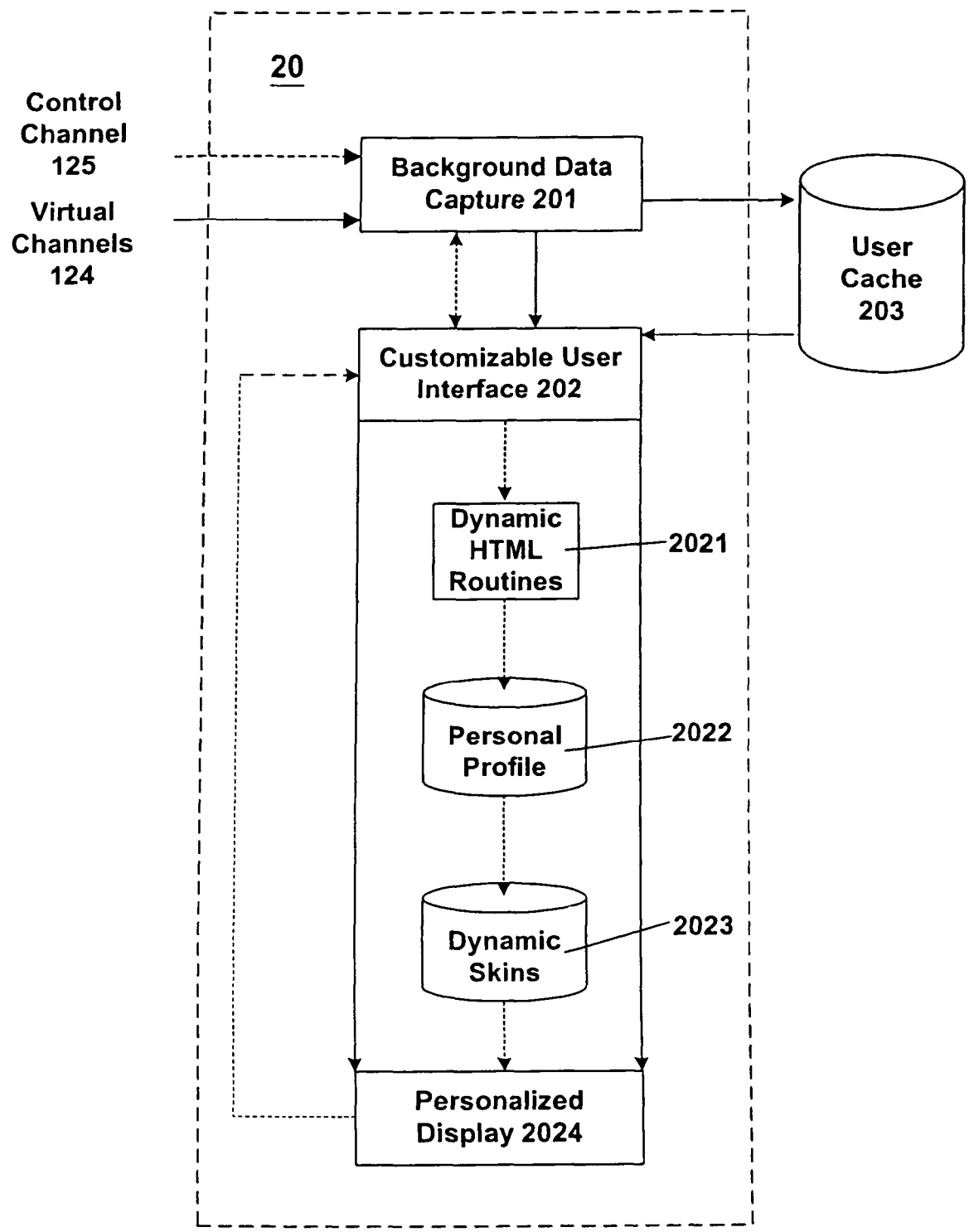
FIG. 13 is a block diagram illustrating components of and operation of a client of the system for delivering personalized broadband content.

FIG. 13 illustrates an embodiment of the client 20. As shown, the client 20 preferably comprises a background data capture routine 201 and a customizable user interface (e.g., a dynamic GUI) 202. The background data capture routine 201 preferably that "tunes" to and interprets virtual channels 124, including the control channel 125. The customizable user interface 202 supports management and display of incoming, data (e.g., content and promotional material) through the selection of hyper-links (e.g., hyper-text markup language ("HTML") links). The customizable user interface 202 preferably utilizes dynamic HTML routines 2021, personal profiles 2022 and dynamic GUI skins 2023 received from the control channel 125 to create a personalized display 2024.

Upon startup, the client preferably connects to the local POP client server 80 to determine link speed (as described above with reference to FIGS. 11-12) and automatically opens the control channel 125 used to provide programming information and deliver dynamic GUI "skins". In the system 10 for delivering personalized broadband content, the dynamic GUIs 202 and their hyper-links are preferably customized for each individual user through the dynamic creation of displays that are a function of personal interests as defined in the personal profile, as well as indicated preferences in GUI presentation (skins). The customizable interface 202 hyper-links preferably support the communication of information regarding user selection of content 122 back to the background capture routine 201 for execution. When a hyper-link for a virtual channel 124 is selected for display or caching, the background capture routine 201 automatically opens membership to the appropriate multicast service, effectively tuning to the requested virtual channel 124. A multicast channel, like a broadcast channel, is generally available while being broadcast. In order to tune to the multicast channel, the client 20 preferably issues a "join" request to join the multicast group of the desired virtual channel 124. This request is sent to the nearest router (e.g., POP client server 80) in order for the client 20 to join the group (i.e., open membership to the appropriate multicast service).

The client 20 preferably enables the concurrent capture of two virtual channels 124 (as well as the control channel 125), making it possible to watch one program or content item while recording (caching) another. The client 20 preferably accomplishes the caching of content 122 (e.g., video and audio streams) through implementation of a process and file structure. The content 122 is preferably cached in a user cache 203 on the user machine 18. Digital rights management of the cached content is discussed below.

Figure 14:
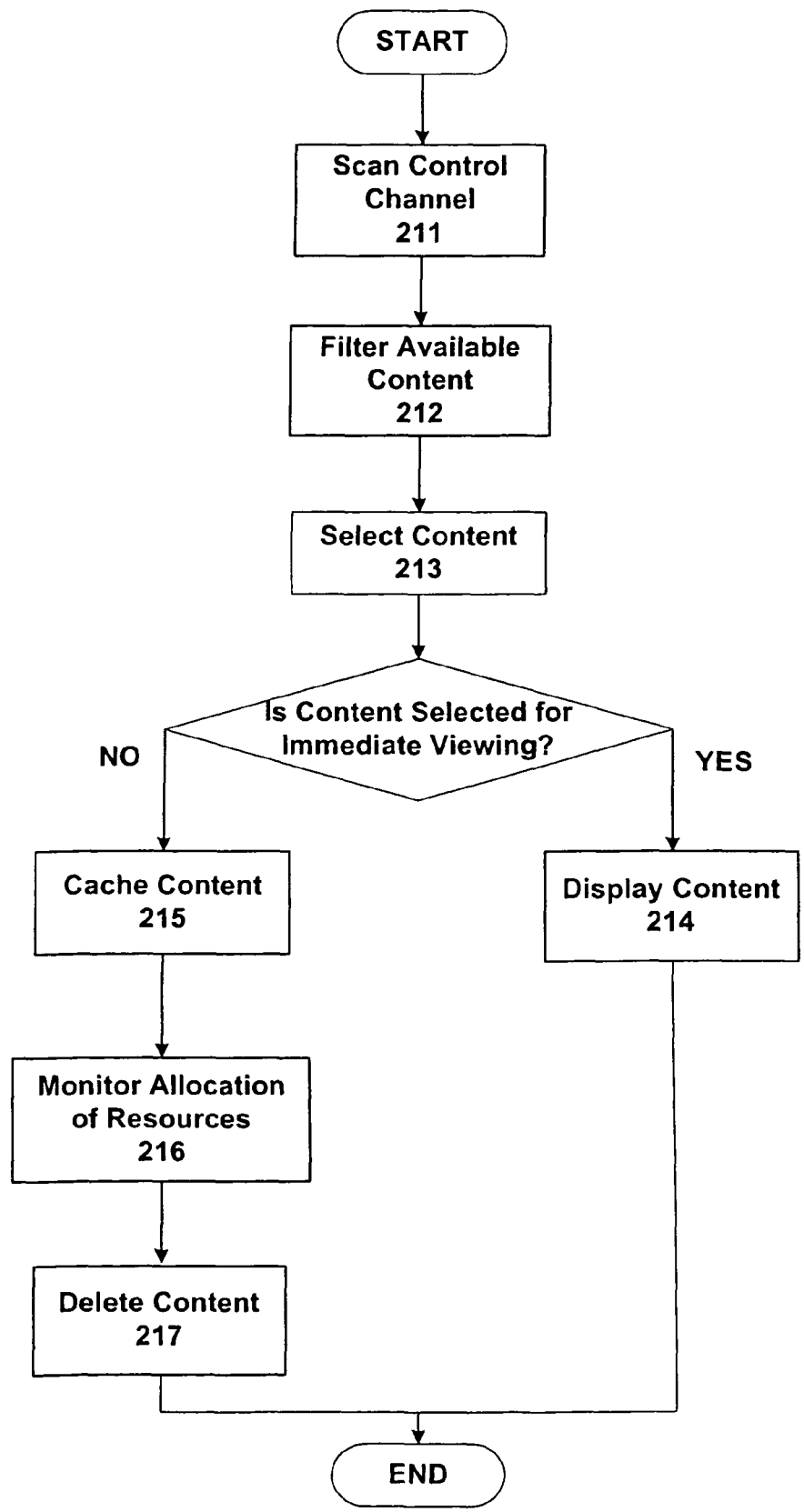
FIG. 14 is a flowchart of a method of client operation.

FIG. 14 is a flowchart illustrating an exemplary method 210 of operation of the client 20. The method 210, preferably executed by the client 20 as described above, preferably comprises: scanning the control channel 211; filtering available content 212; selecting content 213; if the content is selected for immediate viewing, displaying content 214; if the content is not selected for immediate viewing, caching content 215; monitoring allocation of resources 216; and deleting content 217. As noted above, the content 122 may include audio content, so "viewing" and "display" are meant to include listening to or playing audio alone or in conjunction with video, text, or other material. Selecting content 213 may comprise the client 20 selecting content that has been chosen by a user (e.g., by clicking on a hyper-link on the dynamic GUI). The monitoring allocation of resources 216 may comprises determining available space in the user cache 203 and may be performed when content 122 is cached or at regular intervals, for example. The deleting content 217 may comprise deleting content 122 that has an expired expiration date. The steps of the method 210 may be repeated as necessary (for example, the scanning step 211 is preferably executed continually and as new content is available, the filtering step 212 may be performed.)

Figure 15:
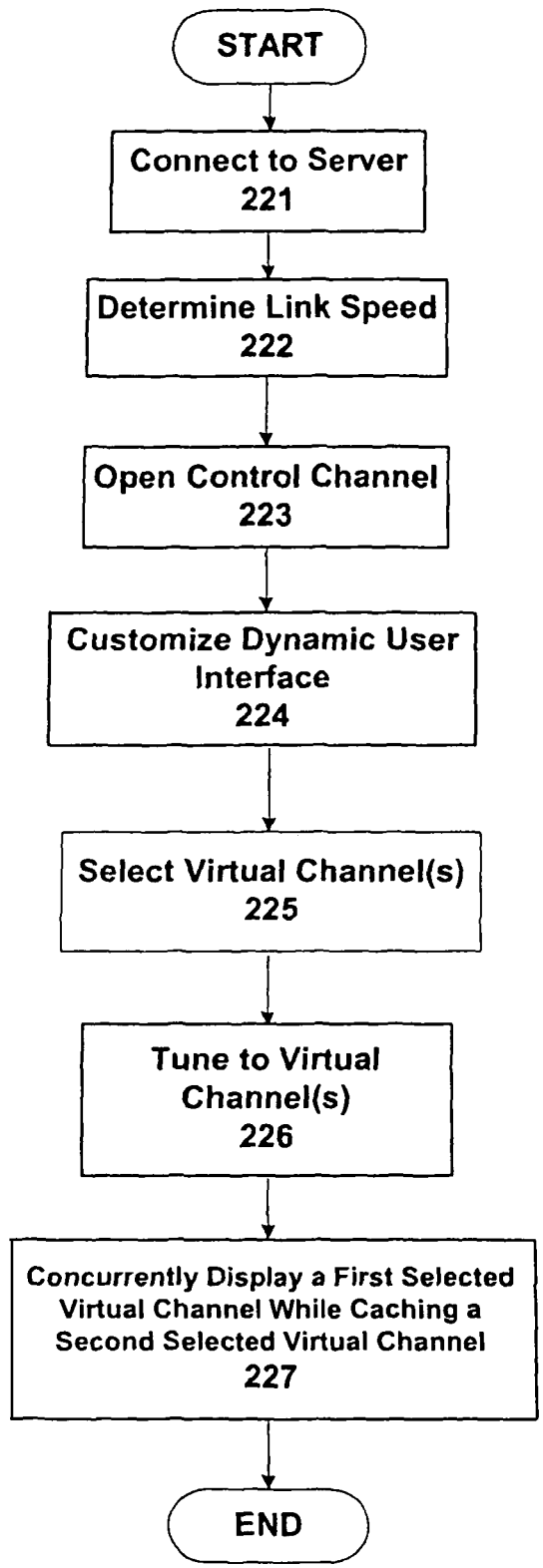
FIG. 15 is a flowchart of a further method of client operation.

FIG. 15 is a flowchart illustrating an additional exemplary method 220 of operation of the client 20. The method 220, preferably executed at least in part by the client 20 as described above, preferably comprises: connecting to server 221; determining link speed 222; opening control channel 223; customizing dynamic user interface 224; selecting virtual channel(s) 225; tuning to virtual channel(s) 226; and concurrently displaying a first selected virtual channel while caching a second selected virtual channel 227. The connecting step 221 preferably comprises the client 20 connecting to the POP client server 80. The opening step 223 may comprise receiving updated GUI skins over the control channel 125, which may be used in the customizing step 224.

Additionally, the client 20 may provide alerts of, for example, new content 122, advertising and e-commerce opportunities based on user profiles and/or what a user is viewing. When new content 122, advertising or e-commerce opportunities that match the interests of a user, as determined from/by the user's profile, the user may be alerted, for example with video in a separate window or the same window, about the new content 122, advertising or e-commerce opportunity. The alerts may interrupt the primary content stream, which the user may pause while viewing the alert to resume viewing later. The alerts may be created by software running in background and/or by searches running in background.

The client 20 preferably provides the capability of caching incoming real-time streams (virtual channels 124) by implementing a generic approach of saving incoming packets to disk along with the time differential from receipt of the last packet from that steam. This allows the client user machine 18 to reconstitute the original real-time steam from disk at any time in the future.

The system 10 for delivering personalized broadband content preferably supports digital rights management that provides and restricts access to certain types of content 122. Installation of the client 20 is preferably a component of the digital rights management. Preferably, installation of the client 20 involves an automated exchange with a License Server (see FIG. 17) located at the NOC 12, whereby a new user is preferably registered and is assigned a unique identification number. As part of the installation process, the user's user machine 18 is profiled, and this information is embedded along with the unique identification number in an encrypted license file—essentially tying the license file to that particular user machine 18. Digital rights management, e.g., the ability to record video or audio streams carried within virtual channels 124, is preferably controlled dynamically at the NOC 12 on a channel-by-channel basis. If the recording of a certain program or e-commerce event, for example, is deemed permissible, users may optionally save the stream to disk (e.g., the user cache 203) for future, on-demand viewing.

When a user has opted to record, the target stream is preferably saved to disk in an encrypted format, whereby the user's unique identification number is stored within the stream file header itself. If the user attempts to view the stored content, the identification number within the stream file header is compared to that stored in the license file, which is in turn validated against the computer profile. If the identification numbers don't match, or the license file is invalid, the stream file is left encrypted and cannot be replayed. Besides preventing an unauthorized user from viewing the recording (i.e., since the user identification number is checked), this mechanism effectively inhibits content stream recordings from being shared between computers (i.e., since the license file is validated against the computer profile).

The encryption of content and use of user ids prevents the access to the content by other user machines 18. Additionally, content can be encrypted with parental controls, such as passwords, to prevent unwanted viewing.

Figure 16:
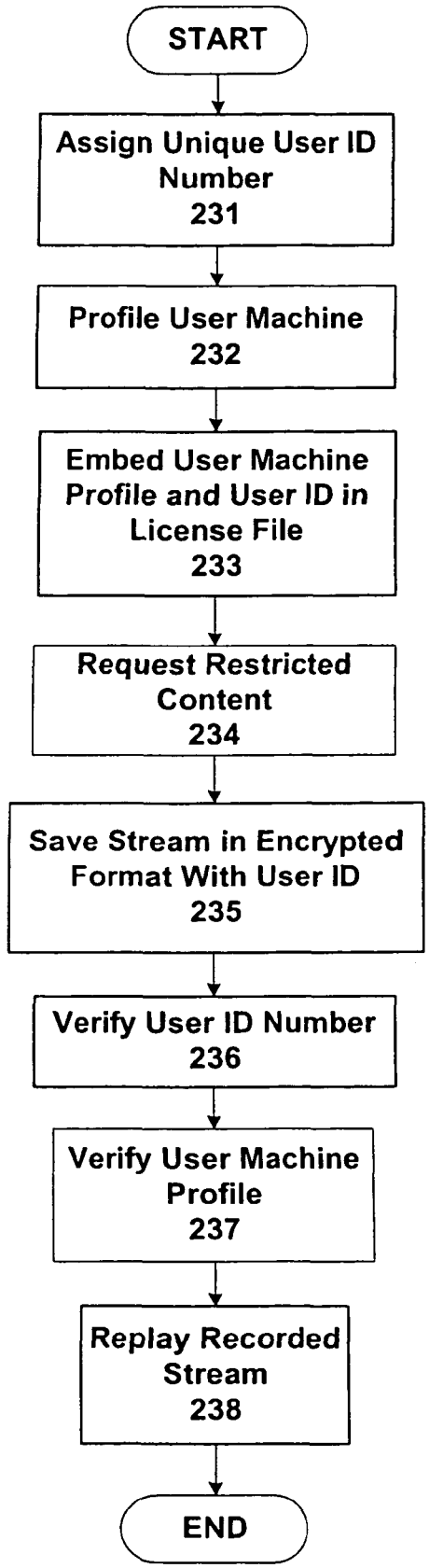
FIG. 16 is a flowchart of a method of client installation and digital rights management.

FIG. 16 is a flowchart illustrating an exemplary method 230 of client installation and digital rights management. The method 230, which is preferably executed by the client 20 in conjunction with components of the NOC 12, preferably comprises: assigning a unique user ID number 231; profiling the user machine 232; embed user machine profile and user ID in license file 233; request restricted content 234; save stream in encrypted format with user ID 235; verify user ID number 236; verify user machine profile 237; and replay recorded stream 238.

Figure 17:
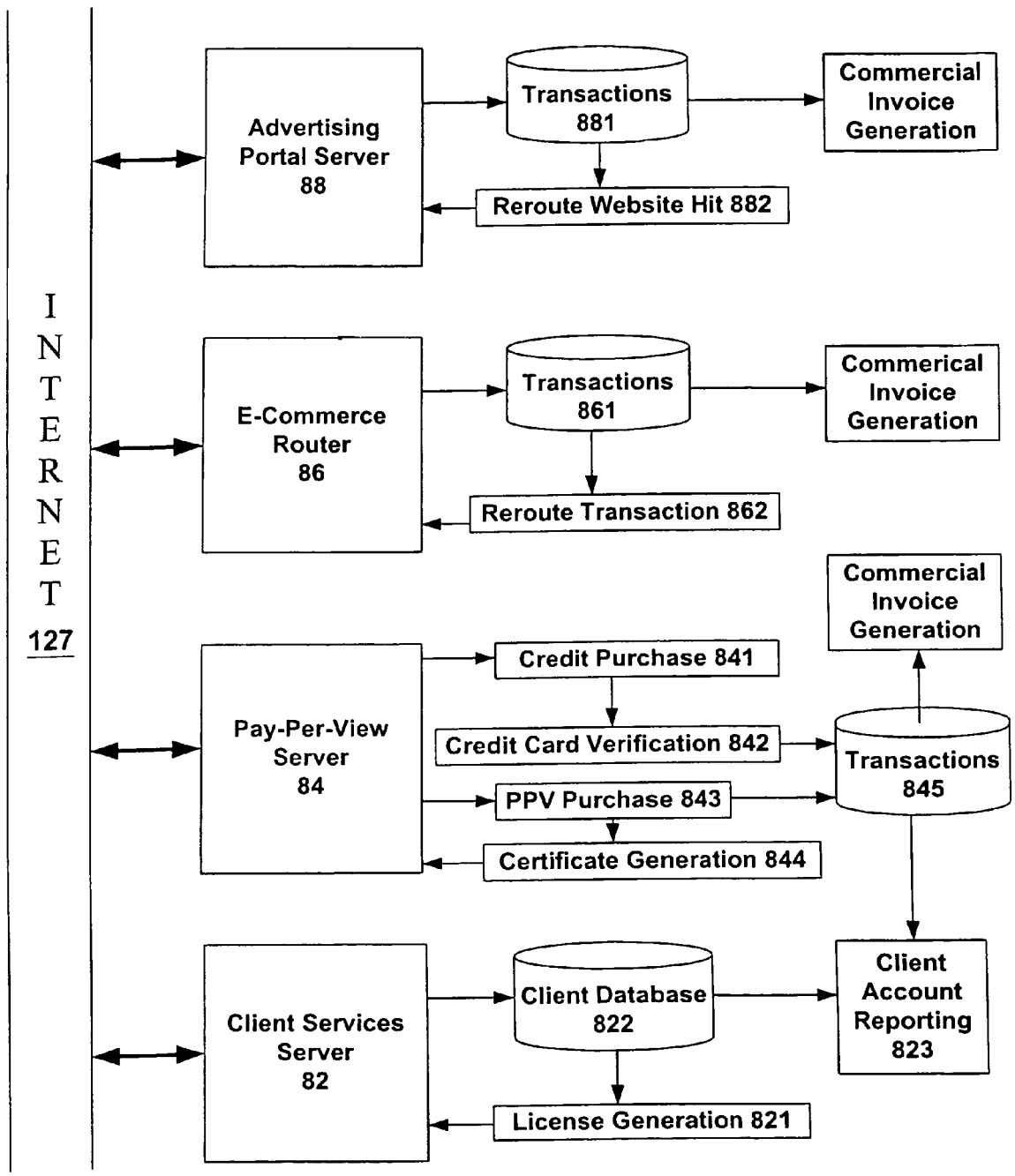
FIG. 17 is a block diagram of additional components of the NOC.

FIG. 17 is a block diagram illustrating additional components of the NOC 12 and operation of the additional components. The additional components are preferably located at the NOC 12 and accessed by clients 20 through the Internet 127. The additional components may be located remotely from the NOC 12. As shown in FIG. 17, the additional components of the NOC 12 may comprise: a client services server 82; a pay-per-view server 84; an e-commerce router 86; and, an advertising portal server 88.

The client services server 82 preferably manages new user registration and provides client services for users. For example, the client services server 82 preferably assigns the unique user identification number to a user as part of the user registration procedure. The client services server 82 preferably stores user information in the client database 822. The client services server 82 preferably stores the user identification number along with the profile of the user's user machine 18 in an encrypted License file that is preferably transmitted over the Internet 127 to the user machine 18, as illustrated by a License Generation 821 block. The License file is used as a control mechanism for both pay-per-view operations and digital rights management of content recordings (as described above with reference to FIG. 16). By including the user machine 18 profile in the License file, the client services server 82 "ties" the License file to a specific user machine 18, preventing use of the License file on another user machine 18. The client services server 82 preferably hosts a Web-site that allows users to view a password protected statement of the user's account with respect to pay-per-view and other operations, as illustrated by the client account reporting 823 block. The client account reporting 823 preferably accesses the client database 822 to determine the user's account balances and transactional information.

Figure 18A:
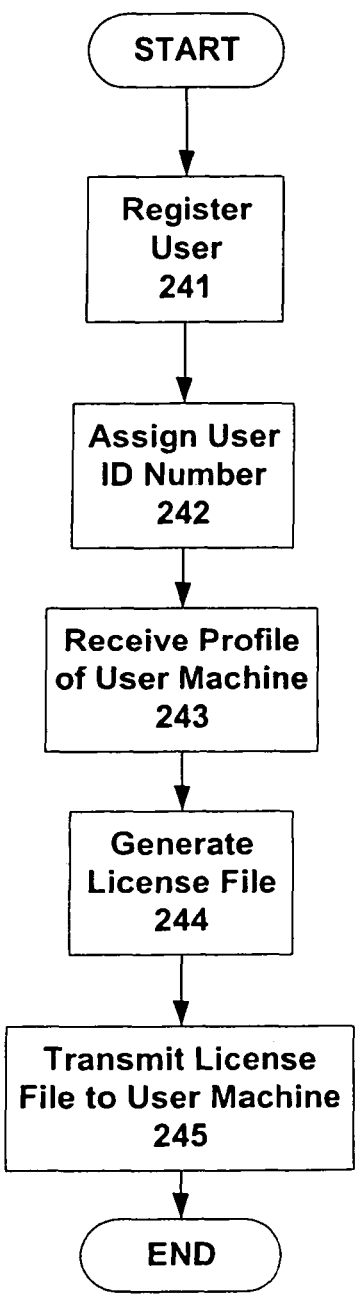
FIG. 18a is a flowchart of a method of license file generation.

FIG. 18a is a flowchart illustrating an exemplary method 240 of user registration and license file creation. The method 240, preferably executed by the client services server 82 in conjunction with a client 20 as described above, preferably comprises: registering a user 241; assigning user an id number 242; receiving profile of user machine 243; generating a license file 244; and, transmitting license file to the user machine 245. Registering a user 241 preferably comprises storing user information in the client database 822. Assigning user an id number 242 preferably comprises the client services server 82 randomly generating a unique user id number. The receiving step 243 preferably comprises the client service server 82 receiving a profile of the user machine 18 generated by the client 20 installed on the user machine 18. The generating step 244 preferably comprises the client services server 82 storing the user id and user machine profile in a license file and encrypting the license file. The transmitting step 245 preferably comprises the client services server 82 transmitting the license file to the user machine 18.

Figure 18B:
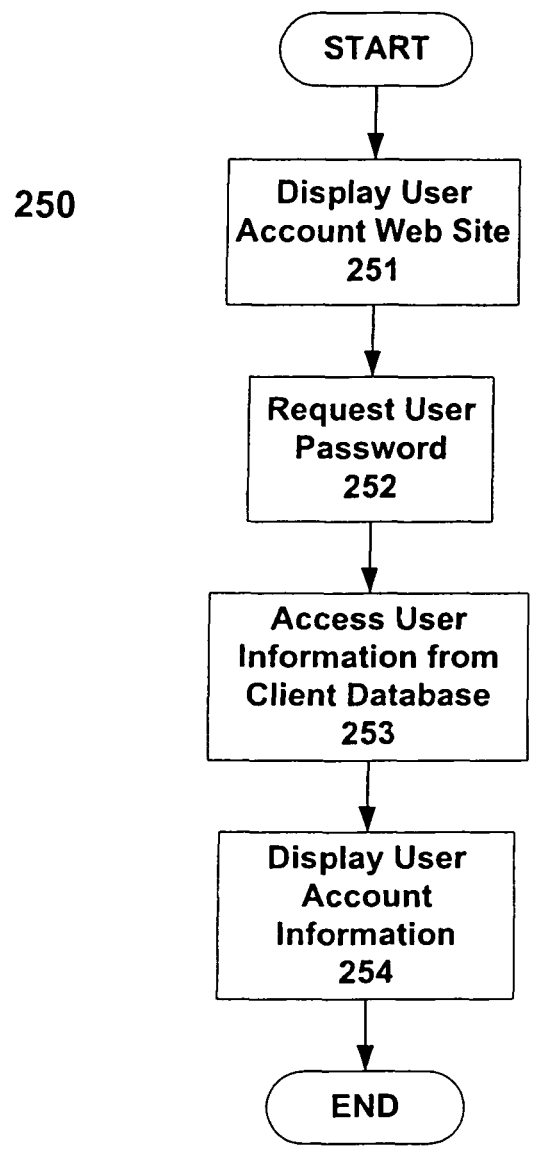
FIG. 18b is a flowchart of a method of account inquiry.

FIG. 18b is a flowchart illustrating an exemplary method 250 of user account inquiry. The method 250, preferably executed by the client services server 82 in conjunction with the client 20, preferably comprises: displaying user account Web-site 251; requesting user password 252; accessing user information from client database 253; and, displaying user account information 254. The displaying step 251 preferably comprises the client services server 82 transmitting one or more Web-pages (not shown) over the Internet to the user machine 18 for display by the client 20 on a browser (e.g., MS I/E). The user password may be assigned or chosen by a user during user registration. If the user password is properly entered, the client services server 82 accesses and retrieves the user information from the client database 822. The displaying step 254 preferably comprises the client services server 82 transmitting the user's account information over the Internet to the user machine 18 for display by the client 20.

Referring again to FIG. 17, the pay-per-view ("PPV") server 84 preferably manages and enables pay-per-view operations of the system 10. Pay-per-view operations are preferably based on a credit system, whereby users purchase credits (fixed denominations) that may be redeemed in exchange for access to pay-per-view events and content, as illustrated by the purchase credits block 841. Credits are preferably purchased via the PPV server 84 in fixed denominations and are transferred directly to a user's personal account. As noted above, status of this account may be viewed at any time via the client services server 82. The credit card verification block 842 indicates processing of a credit card purchase of credits.

Access to pay-per-view events, as indicated by the PPV purchase block 843, is preferably granted by the PPV server 84 through issuance of an encrypted "certificate" detailing the broadcast of the event and the type and duration of access authorized. The certificate generation block 844 indicates issuance of the certificate. These certificates are preferably transmitted to (e.g., over the Internet) and stored on the user's user machine 18 as part of a pay-per-view purchase transaction. The PPV purchase 843 comprises verifying that the user has sufficient credits and deducting the cost of the purchase from the user credit balance. The transactions block 844 indicates that the client account reporting 823, as discussed above, is utilized to access the user's account. For example, the PPV server 84 may access the user account Web-site to determine the user's account credit balance. The transactions block 844 also indicates that a commercial invoice may be generated. The PPV server 84 may generate a commercial invoice if, for example, a third party rewards the user with credits for some transaction and the user redeems the credits to purchase a PPV event or content. The commercial invoice may be a bill for the rewarded/redeemed credits.

The certificates generated by the PPV server 84 preferably include a reference to the user's unique ID. If this number matches that which is embedded in the user's License file—which in turn is validated against the user machine 18 profile—the certificate to be considered valid. This verification mechanism effectively inhibits the transfer of pay-per-view certificates between systems.

Figure 19:
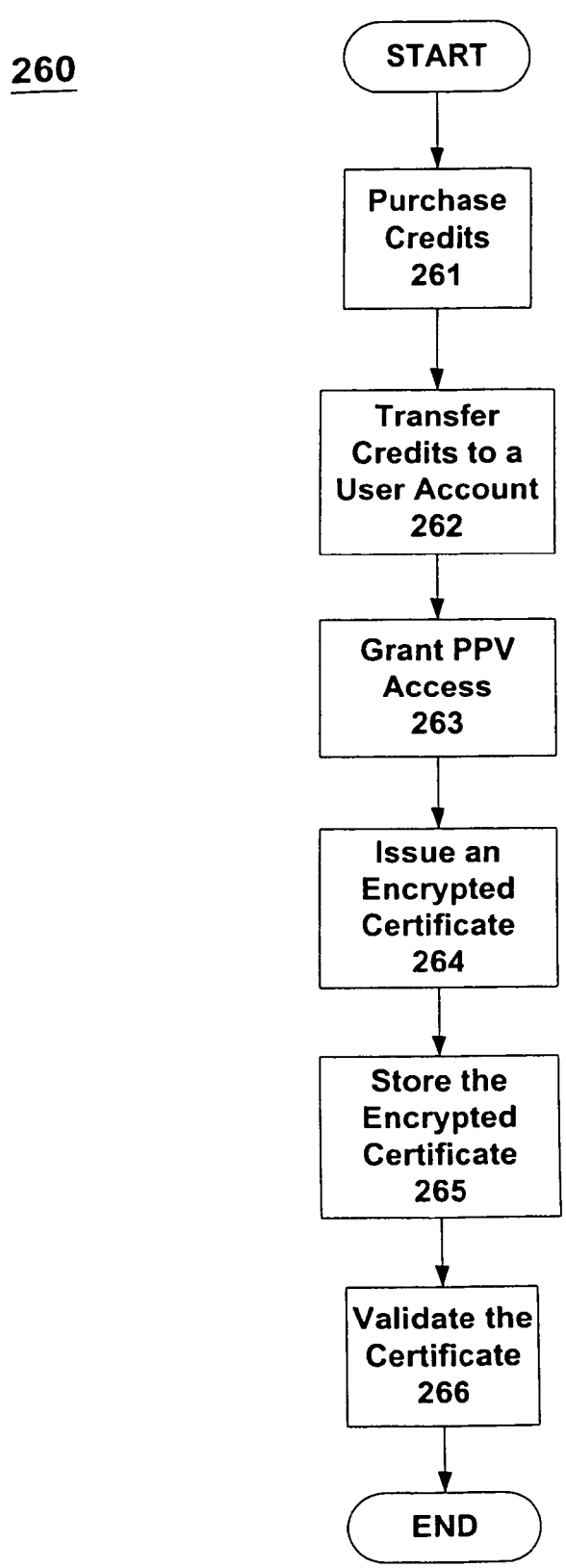
FIG. 19 is a flowchart of a method of pay-per-view access.

FIG. 19 is a flowchart illustrating an exemplary method 260 of pay-per-view access. The method 260, preferably executed by the PPV server 84 and a client 20 as described above, preferably comprises: purchasing credits 261; transferring credits to a user account 262; granting pay-per-view access 263; issuing an encrypted certificate 264; storing the encrypted certificate 265; and validating the encrypted certificate 266. Transferring credits to a user account 262 may comprise a third party transferring credits to the user account as a reward (e.g., for visiting the a Web-site). The granting step 263 preferably comprises verifying that the user has sufficient credits. The validating step 266 preferably comprises comparing the user ID in the certificate with that stored in the user's License file stored on the user machine 18 and comparing the user machine profile in the License file to the user machine 18. If both the user ID and user machine 18 are verified, the certificate is encrypted and the user may view the PPV event or content on the user machine 18.

Figure 20:
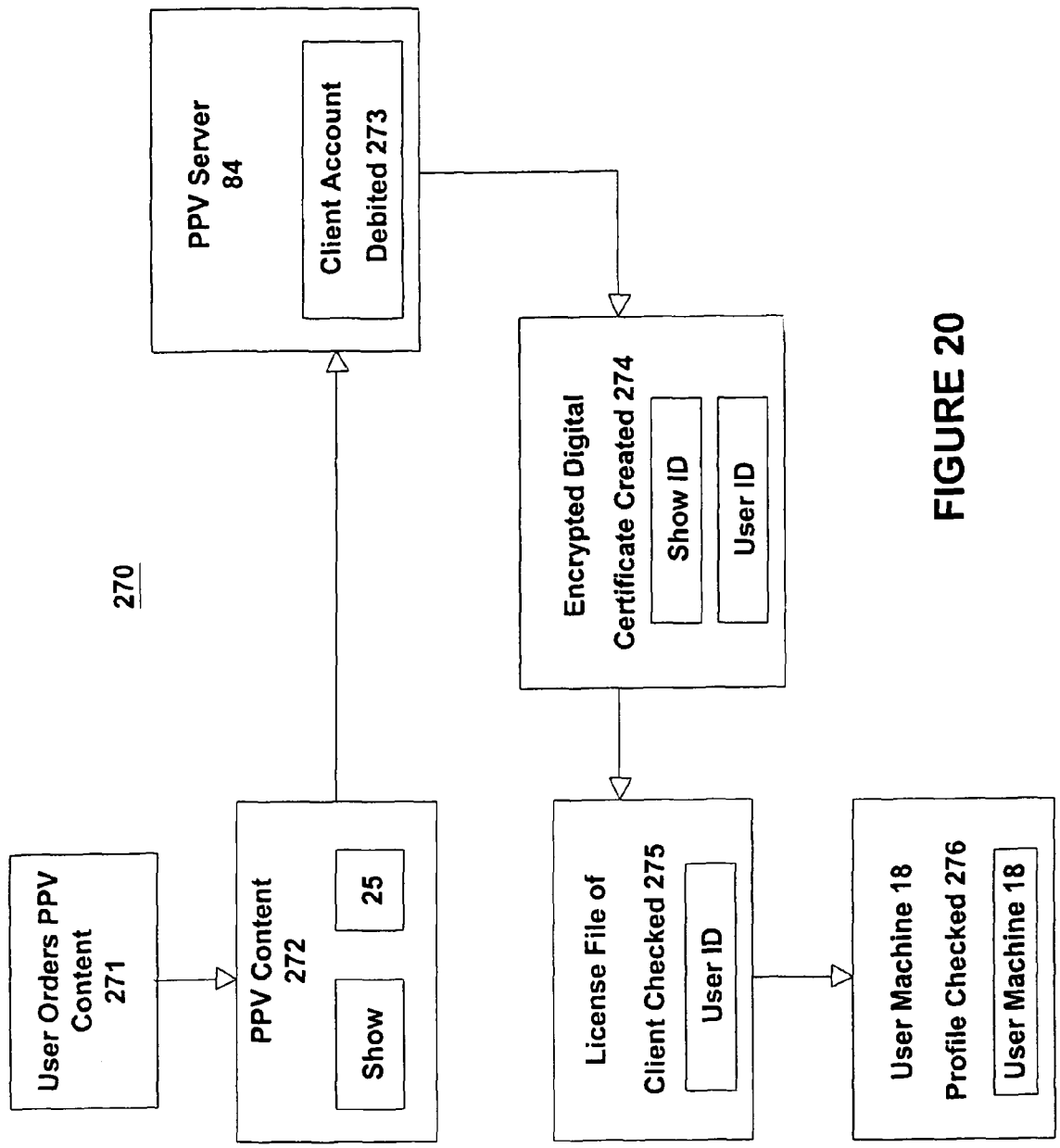
FIG. 20 is a logic flow/block diagram of a pay-per-view access operation.

FIG. 20 is a logic flow/block diagram illustrating another exemplary method 270 of PPV access. As shown, the method 270 preferably comprises a user ordering PPV content or a PPV event 271, wherein the PPV content 272 is a show costing 25 credits; the PPV server 84 debiting the user's account by 25 credits 273; creating an encrypted digital certificate 274, wherein the certificate comprises the show ID and the user ID; checking the license file of the client 275; and checking the user machine profile 276.

Referring back to FIG. 17, the e-commerce router 86 is preferably a server responsible for routing e-commerce opportunities to clients 20 and re-routing e-commerce transactions to third-party e-commerce providers. Web-based e-commerce opportunities within the system 10 that are broadcast as part of a virtual channel 124 are preferably first processed at the NOC 12 (e.g., by NOC staff) to implement an "interception" of purchase transactions back to the NOC 12. When a user selects an e-commerce opportunity for purchase (or other use) via a client 20, the e-commerce purchase is preferably intercepted by the NOC 12, and specifically by the e-commerce router 86 (e.g., via the Internet). The e-commerce router 86 preferably records each incoming (secure) purchase in a transaction database 861. The e-commerce router 86 then preferably automatically securely re-routs the purchase to the originally defined destination, as indicated by the re-route transaction block 862. The implementation of this e-commerce routing provides a strict control mechanism for the tracking of e-commerce generated revenues, and enables the proactive invoicing of partner e-commerce retailers. As seen in FIG. 17, the e-commerce router 86 and the transaction database 861 may generate a commercial invoice that charges the e-commerce retailers/providers for e-commerce transactions routed through the e-commerce router 86 (and hence, generated through the system 10).

Figure 21:
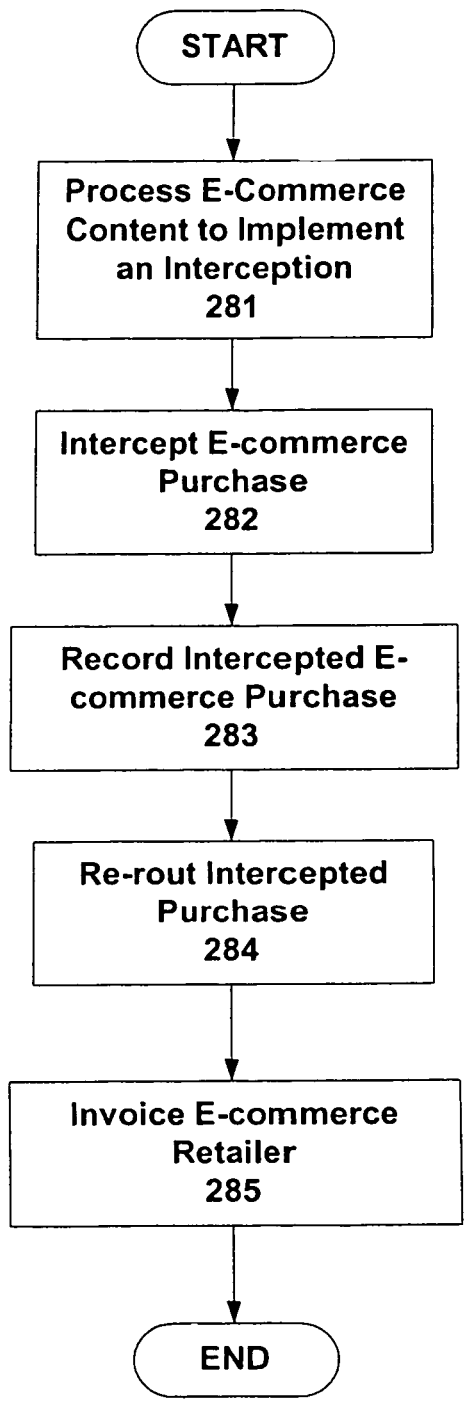
FIG. 21 is a flowchart of a method of e-commerce purchasing.

FIG. 21 is a flowchart illustrating an exemplary method 280 of e-commerce purchasing. The method 280, preferably executed by the e-commerce router 86 and other components of the system 10 as described above, preferably comprises: processing e-commerce content to implement an interception 281; intercepting an e-commerce purchase 282; recording the intercepted e-commerce purchase 283; and re-routing intercepted e-commerce purchase 284.

Referring to FIG. 17 again, the advertising portal server 88 preferably manages advertising material delivered via the system 10. Preferably, advertising material is first processed at the NOC 12 (e.g., by NOC staff) to implement a "redirect" of advertising clicks back to the advertising portal server 88. When a user clicks on advertising material, the clicks are re-directed so that incoming clicks are registered in a transaction database 881 before being redirected 882 back to their original destination or website. The registration of the incoming clicks enables the advertising portal server 88 to track the effectiveness of targeted advertising and enables the proactive invoicing of partner advertisers for portal revenues. As seen in FIG. 17, the advertising portal server 88 and the transaction database 881 may generate a commercial invoice that charges the partner advertisers for advertising clicks (or hits) re-directed through the advertising portal server 88 (and hence, generated through the system 10).

Figure 22:
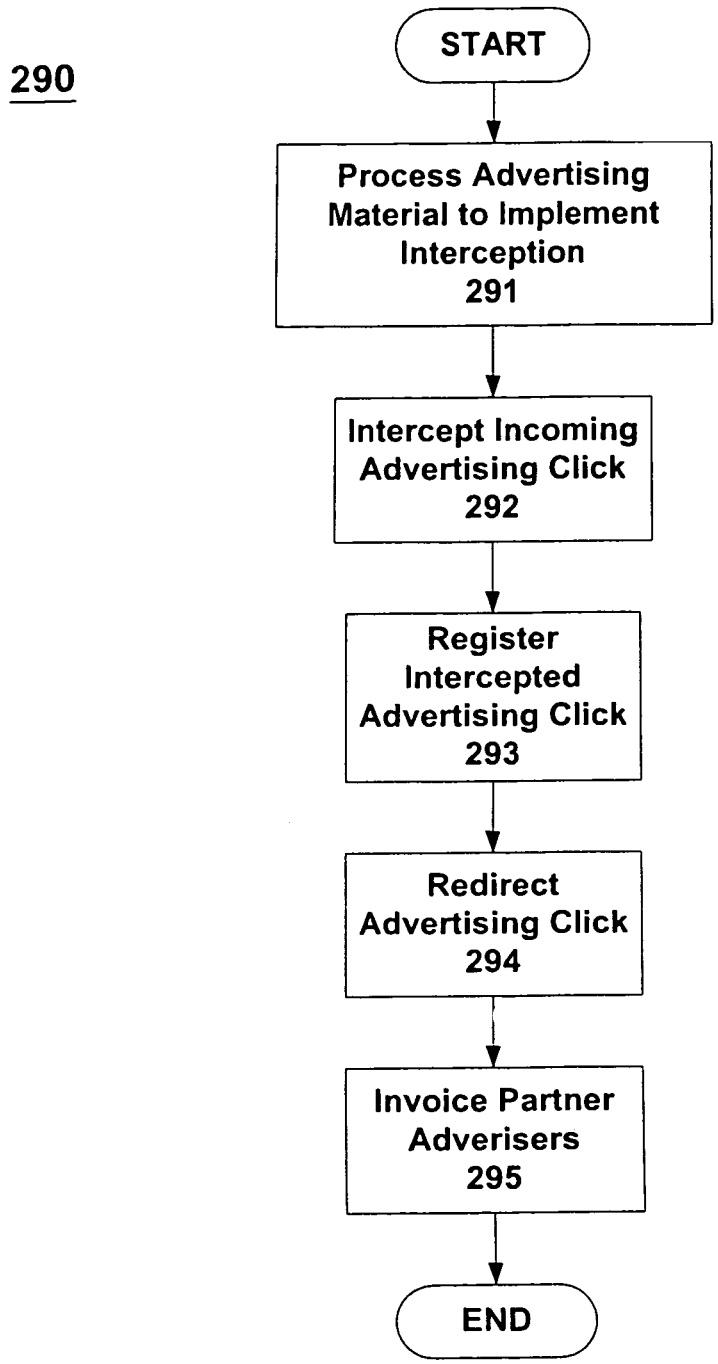
FIG. 22 is a flowchart of a method of advertising redirection.

FIG. 22 is a flowchart illustrating an exemplary method 290 of advertising re-direction. The method 290, preferably executed by the advertising portal server 88 and other components of the system 10 as described above, preferably comprises: processing advertising material to implement redirection 881; intercepting incoming advertising click 882; registering intercepted advertising click 883; redirect advertising click 884; and, invoicing partner advertisers 885.

The implementation of a credit system in support of pay-per-view operations in the system 10 provides an unprecedented opportunity to openly barter with users for access to information concerning the users personal habits, preferences, or opinions ("data mining"). For example, as described above the client 20 incorporates the capability of tracking the personal viewing habits of each user profiled per client installation. Data mining collects user personal habits, preference, or opinions on a voluntary basis in exchange for credits, which may be redeemed for pay-per-view purchases. Advertising partners may create "credit enable" Web pages (not shown). These pages preferably incorporate an automated transaction that credits a users account in exchange for the return of information, or for the viewing of specific advertising opportunities. The same transaction automatically debits the advertiser's account, supporting the generation of a commercial invoice for credits allocated. This automated transaction preferably utilizes the PPV server 84 to accomplish these credits and debits, as described above. This data mining enables qualified lead generation (e.g., sales leads) for vendors, such as automotive dealers.

Moreover, the system 10 operators may provide credits to users for viewing advertising. These credits may be redeemed for pay-per-view or other purchases. The client 20 preferably verifies that the user watched the advertisement (e.g., that the complete advertisement was displayed) and provides advertisers a unique opportunity to target advertising and verify that their content is viewed.

Figure 23:
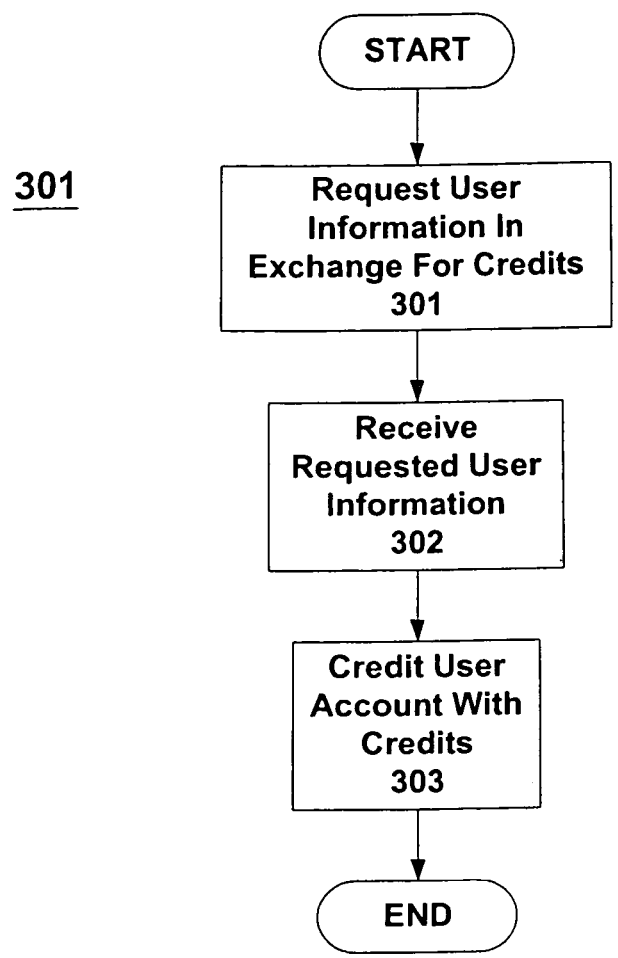
FIG. 23 is a flowchart of a method of data mining.

FIG. 23 is a flowchart illustrating an exemplary method 300 of data mining. The method 300 preferably comprises: requesting user information in exchange for credits 301, wherein the credits may be used to purchase PPV content and events; receiving the requested user information 302; and crediting the user account with credits 303. The method 300 may also comprises debiting credits from a third-party account, wherein the number of credits credited to the user account are debited from the third-party account.

Figure 24:
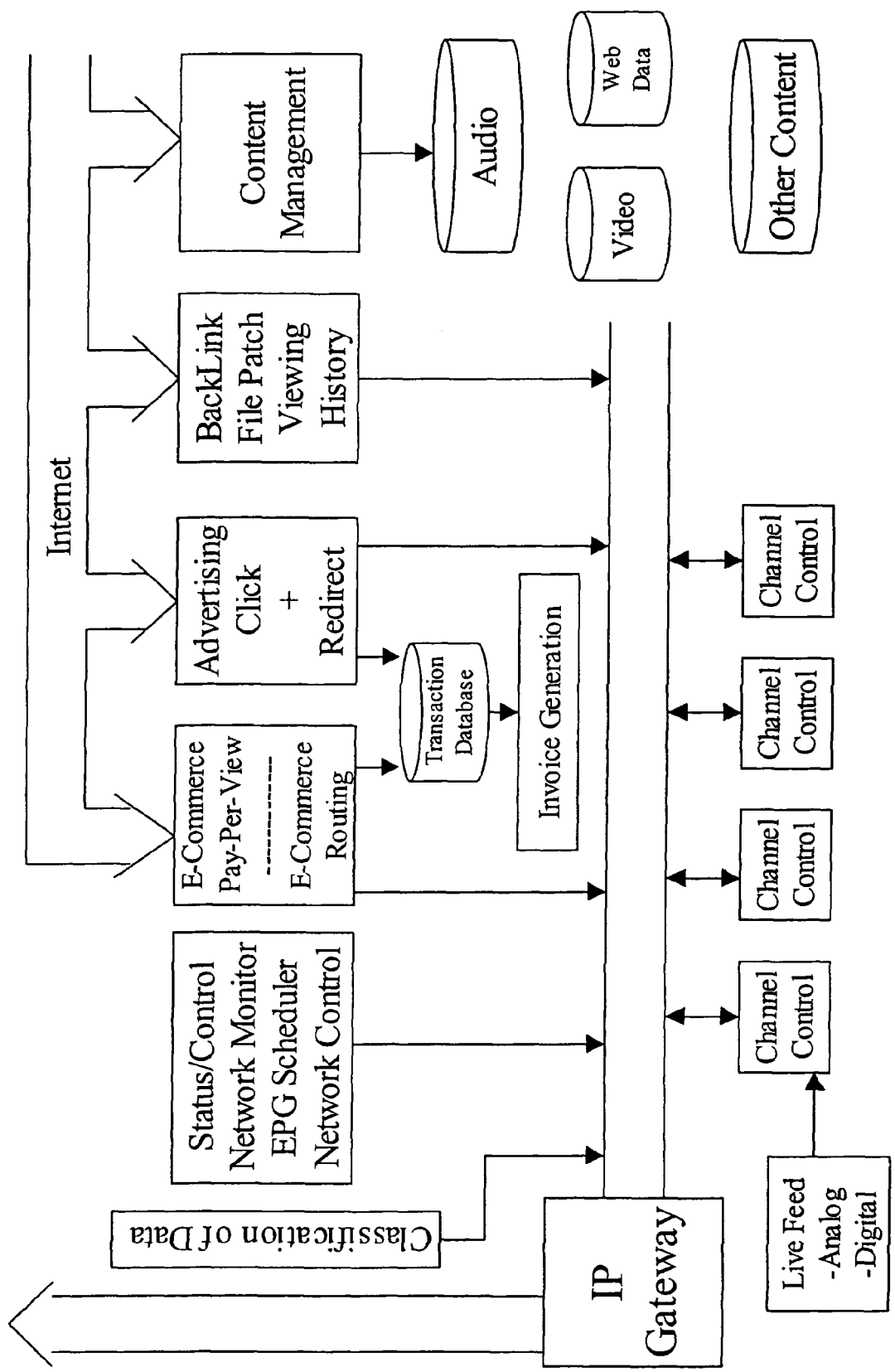
FIG. 24 is a block diagram of an alternative embodiment of the NOC.

FIG. 24 is a block diagram illustrating an alternative embodiment of the NOC.

Figure 25:
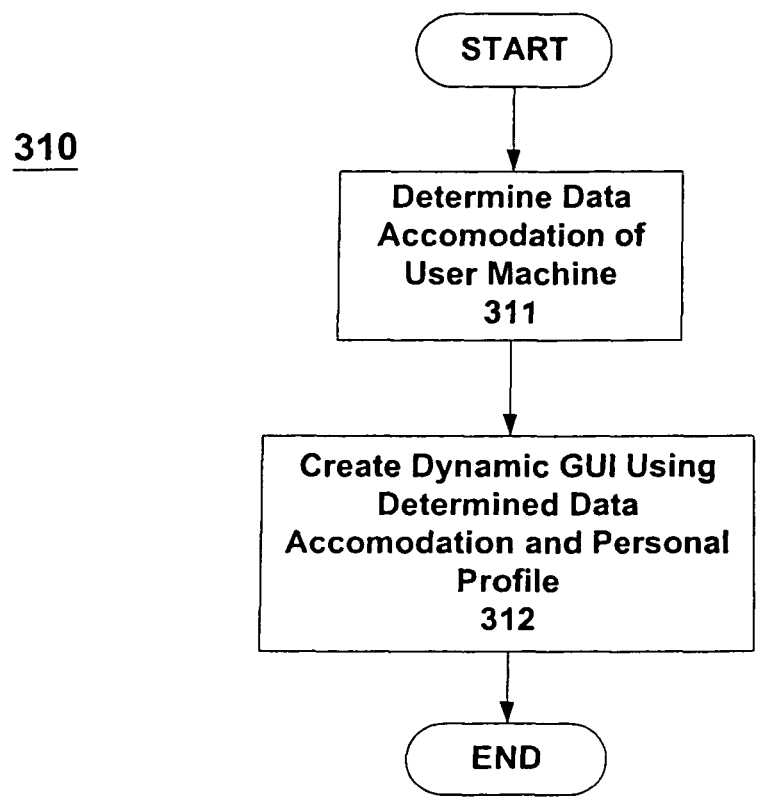
FIG. 25 is a flowchart of a method of creating a dynamic GUI.

FIG. 25 is a flowchart illustrating an exemplary method 310 of creating a dynamic GUI. The method 310 preferably comprises: determining data accommodation of a user machine 311 and, creating a dynamic GUI using the determined data accommodation and a user's personal profile 312. The data accommodation is preferably the bandwidth capacity of a user machine 18.

Figure 26:
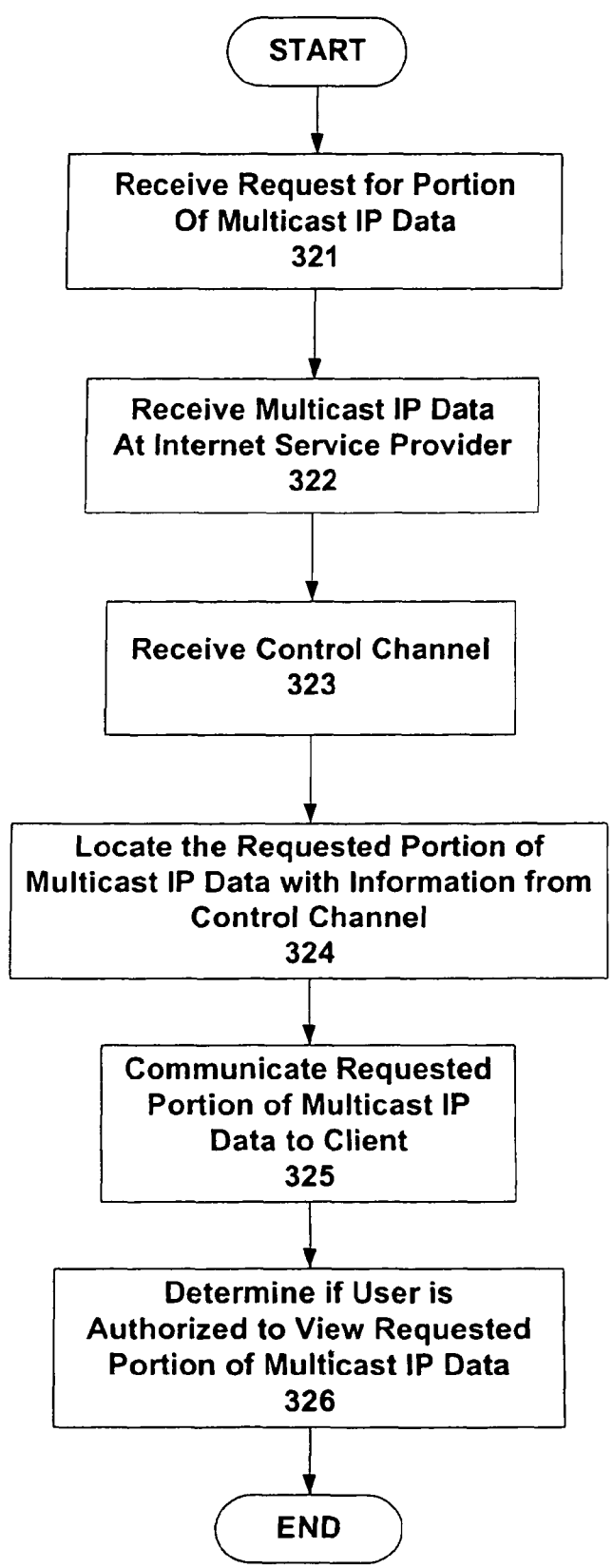
FIG. 26 is a flowchart of a method of delivering personalized broadband content.

FIG. 26 is a flowchart illustrating an exemplary method 320 of delivering personalized broadband content. The method 320 preferably comprises: receiving a request for a portion of Multicast IP data 321; receiving Multicast IP data at internet service provider 322; receiving a control channel 323; locating the requested portion of Multicast IP data with information from control channel 324; communicating requested portion of Multicast IP data to client 325; and, determining if user is authorized to view requested portion of Multicast IP data 326. The receiving a request step 321 may comprise the POP client server 80 receiving a request for content 122 from a client 20. The receiving Multicast IP data step 322 may comprise the POP client server 80 receiving the virtual channels 124 at the broadband ISP 16. The receiving a control channel step 323 may comprise the POP client server 80 receiving the control channel 125 at the broadband ISP 16. The locating step 324 may comprise the POP client server 80 locating the virtual channel 124 with the requested content 122 using information contained on the control channel 125. The communicating step 325 may comprise the POP client server 80 transmitting the requested content over a broadband connection to the user machine 18 on which the client 20 resides. The determining step 326 may comprise checking for a certificate file and/or checking a license file, as described above, to verify user authorization.

Figure 27:
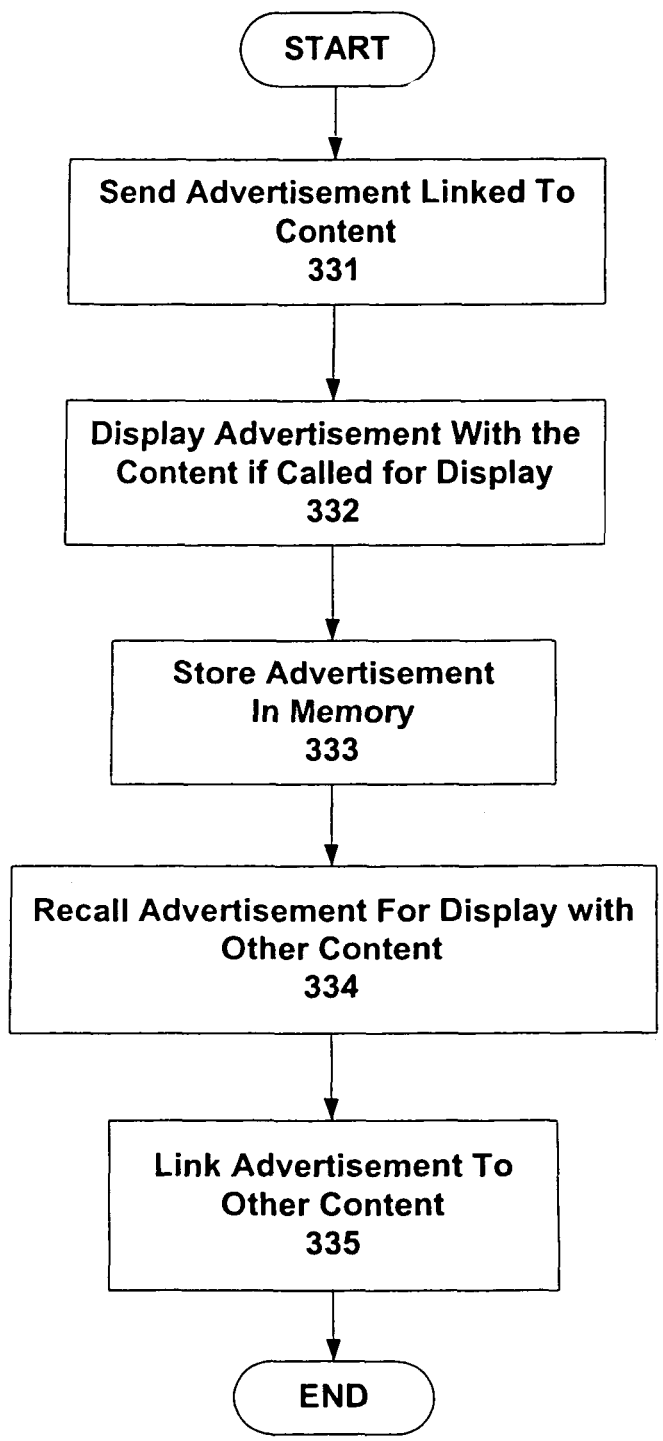
FIG. 27 is a flowchart of another method of advertising in the system for delivering personalized broadband content.

FIG. 27 is a flowchart illustrating another method 330 of advertising in the system 10 for delivering personalized broadband content. The method 330 preferably comprises: sending advertisement linked to content 331; displaying the advertisement with the content if called for display 332; storing advertisement in memory 333; recalling advertisement for display with other content 334; and, linking advertisement with other content 335. The sending step 331 may comprise an advertising provider transmitting an advertisement to the NOC 12. The displaying step 332 comprises the client 20 displaying the advertisement with its linked content on the user machine 18. The storing step 334 may comprise the client 20 storing the content in the user cache 203. The recalling step 334 may comprise the client 20 retrieving the stored advertisement from the user cache 203 when the stored advertisement meets some criteria with regard to content being displayed (e.g., a beer commercial for display during a football game). The linking step 335 may comprise the client 20 re-linking the advertisement to content for future display.

What we claim is:

1. A method for method of delivering personalized broadband content, comprising:
receiving a plurality of virtual channels at a user machine, wherein each of said plurality of virtual channels comprises content, including a plurality of content streams, each comprising streaming audio and video;
receiving a control channel that includes information about the virtual channels, including information about the content included in each virtual channel; and
using the control channel, creating a personalized display of content choices available to a user on the user machine based on a user's personal profile and user capabilities for receiving the virtual channels,
wherein the control channel displays filtered virtual channel content choices in a graphical user interface (GUI), and
wherein the plurality of content streams further comprises promotional material synchronized with the streaming audio and video so as to leave the primary content stream unaltered wherein the promotional material is selected based on the user's personal profile.

2. The method of claim 1, wherein the GUI comprises a skin personalized for the user using a user profile that was generated based on user activity over a period of time and updated based on a user's continuing activity, wherein the skin comprises target advertising and e-commerce opportunities based on user feedback received over the Internet or other transmission medium.

3. The method of claim 1 wherein the content is multimedia content.

4. The method of claim 1 wherein the content is made available from a source using a satellite transponder to multicast the content.

5. The method of claim 1 wherein the content includes infomercials with links to web sites.

6. The method of claim 1 wherein the content is routed to the user machine by a software module resident at an Internet Service Provider ("ISP") or a dedicated server at the ISP.

7. The method of claim 1, wherein the determining step and the creating step are performed by a software module resident on the user machine.

8. The method of claim 1, further comprising selecting one of the plurality of filtered virtual channels from the display of content choices; and displaying or storing content from the selected virtual channel.

9. The method of claim 1, further comprising selecting a second one of the plurality of virtual channels from the display of content choices and concurrently displaying the content from the selected first virtual channel while storing content from the selected second virtual channel, wherein the selected virtual channels includes advertising targeted to the user based on the user's personal profile.

10. The method of claim 1, further comprising providing alerts of new content, advertising, or e-commerce opportunities based on the user's personal profile, wherein the alerts interrupt the primary content stream being viewed by the user, and wherein the primary content stream can be paused by the user while viewing the alerts and can be resumed later.

11. The method of claim 1, wherein a network operations center ("NOC"), comprising one or more servers, receives the content comprising streaming audio, streaming video, and advertising or promotional material and schedules the content for broadcast on the virtual channels;
    wherein a transmission medium operatively connected to the NOC transmits the virtual channels;
    wherein a point-of-presence ("POP") client server receives at least a subset of the virtual channels and is connected via a network to the user machine and wherein the POP client server comprises client software that issues requests for virtual channels and processes the virtual channels to display the content and promotional materials on the user machine;
    wherein the filtered content choices are displayed on the user machine; and
    wherein the POP client server routes virtual channels to the user machine based on the requests by the client software.

12. The method of claim 11, wherein the user machine comprises a user cache and the client software stores content from virtual channels in the user cache.

13. The method of claim 11, wherein the user machine includes a personal profile and the client software filters the virtual channels based on the client software, wherein the client software further comprises the GUI.

14. The method of claim 11, wherein the promotional material include e-commerce opportunities through which a user on the user machine makes a purchase and wherein the NOC further comprises an e-commerce router that intercepts the user purchase, records the user purchase, re-routs the user purchase to a provider of the e-commerce opportunity, and invoices the provider for the purchase.

15. The method of claim 11, wherein the promotional materials include an advertisement with hyper-links that is clicked by the user at the user machine and wherein the NOC further comprises an advertising portal server that intercepts the advertisement click of the user, records the advertisement click, re-routes the advertisement click to a provider of the advertisement, and invoices the provider for the advertisement link.

16. The method of claim 11, wherein the transmission medium is a satellite and the POP client server is located at a broadband ISP that receives the virtual channels via satellite.

17. The method of claim 1 further comprising determining which virtual channels the user machine should display.

18. The method of claim 1 further comprising determining a link speed that a user machine can accommodate for receiving the virtual channels.

19. A tangible computer readable medium comprising instructions delivering personalized broadband content by:
    receiving a plurality of virtual channels at a user machine, wherein each of said plurality of virtual channels comprises content, including a plurality of content streams, each comprising streaming audio and video;
    receiving a control channel that includes information about the virtual channels, including information about the content included in each virtual channel; and
    using the control channel, creating a personalized display of content choices available to a user on the user machine based on a user's personal profile and user capabilities for receiving the virtual channels,
    wherein the control channel displays filtered virtual channel content choices in a graphical user interface (GUI), and
    wherein the plurality of content streams further comprises promotional material synchronized with the streaming audio and video so as to leave the primary content stream unaltered, wherein the promotional material is selected based on the user's personal profile.

* * * * *